(12) United States Patent
Grip

(10) Patent No.: US 12,325,529 B2
(45) Date of Patent: Jun. 10, 2025

(54) SYSTEM AND METHOD OF CONTROLLING THE DEFLECTIONS OF A PRESSURE TANK MOUNTED WITHIN A VACUUM TANK

(71) Applicant: The Boeing Company, Arlington, VA (US)

(72) Inventor: Robert E. Grip, Rancho Palos Verdes, CA (US)

(73) Assignee: The Boeing Company, Arlington, VA (US)

( * ) Notice: Subject to any disclaimer, the term of this patent is extended or adjusted under 35 U.S.C. 154(b) by 117 days.

(21) Appl. No.: 18/336,993

(22) Filed: Jun. 17, 2023

(65) Prior Publication Data
US 2024/0417098 A1   Dec. 19, 2024

(51) Int. Cl.
| | | |
|---|---|---|
| F17C 1/12 | (2006.01) | |
| B64D 37/04 | (2006.01) | |
| B64D 37/06 | (2006.01) | |
| F17C 1/02 | (2006.01) | |
| F17C 13/08 | (2006.01) | |

(52) U.S. Cl.
CPC ............. *B64D 37/06* (2013.01); *B64D 37/04* (2013.01); *F17C 1/02* (2013.01); *F17C 13/083* (2013.01); *F17C 2203/013* (2013.01); *F17C 2270/0189* (2013.01)

(58) Field of Classification Search
CPC ...... F17C 2205/0188; F17C 2205/0149; F17C 2205/0157; F17C 2205/0153; F17C 3/08; F17C 3/085; F17C 2270/0509; F17C 2203/0387; F17C 2203/0391; F17C 2270/0189; F17C 13/083; F17C 1/02; F17C 1/12; F17C 2203/013; F17C 2201/035; B64D 37/04; B64D 37/06
See application file for complete search history.

(56) References Cited

U.S. PATENT DOCUMENTS

| | | | | |
|---|---|---|---|---|
| 2,818,191 A | * | 12/1957 | Arne | F17C 1/08 |
| | | | | 220/565 |
| 3,243,150 A | | 3/1966 | Woodcock | |
| 3,414,153 A | * | 12/1968 | Leroux | B65D 88/02 |
| | | | | 220/553 |
| 5,012,948 A | * | 5/1991 | Van Den Bergh | F17C 13/087 |
| | | | | 505/892 |
| 2023/0313946 A1 | | 10/2023 | Bergan | |

OTHER PUBLICATIONS

Grainger, Neoprene Hanger datasheet, printed on Jun. 15, 2023.

* cited by examiner

*Primary Examiner* — Stephen J Castellano

(57) ABSTRACT

A tank system includes a vacuum tank and a pressure tank. The vacuum tank has a vacuum tank main portion extending between vacuum tank end portions. The pressure tank is mounted within the vacuum tank, and has a pressure tank main portion extending between pressure tank end portions. The tank system includes a deflection control system comprising at least one elongate support member extending from a vacuum tank first side of the vacuum tank main portion, and passing through an opening in a pressure tank first side of the pressure tank main portion, and coupled to a pressure tank second side opposite the pressure tank first side. The elongate support member is configured to support the pressure tank main portion and reduce deflections of the pressure tank main portion relative to the vacuum tank main portion when the tank system is subjected to a load.

20 Claims, 18 Drawing Sheets

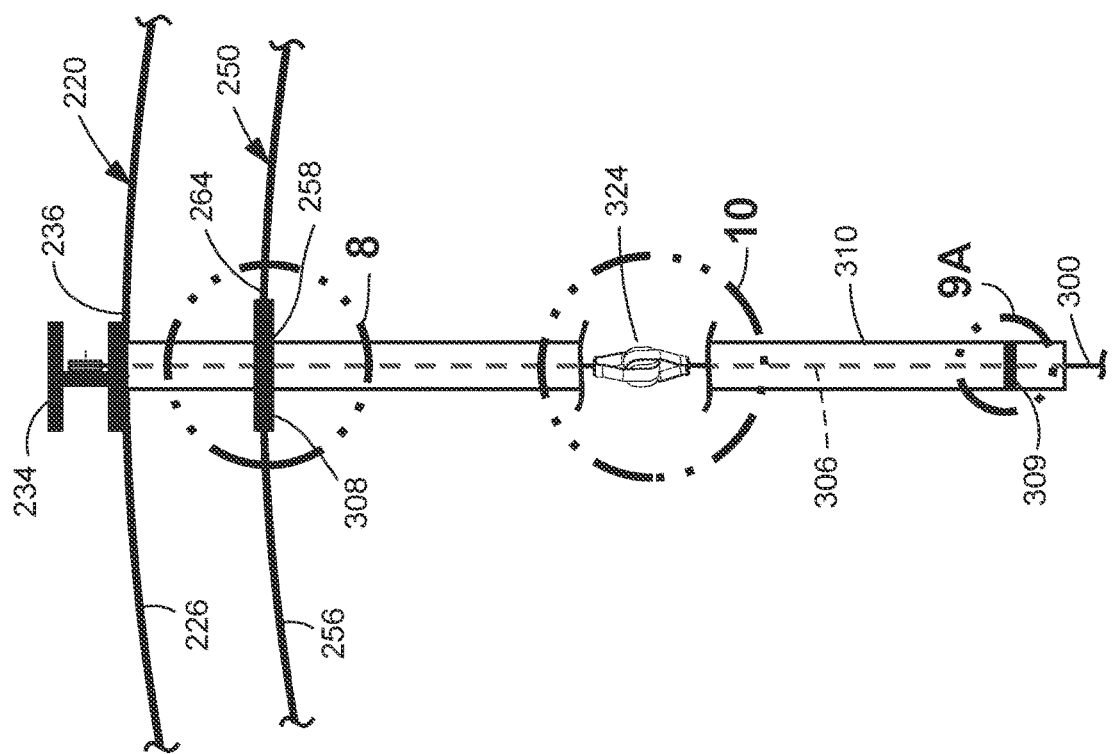

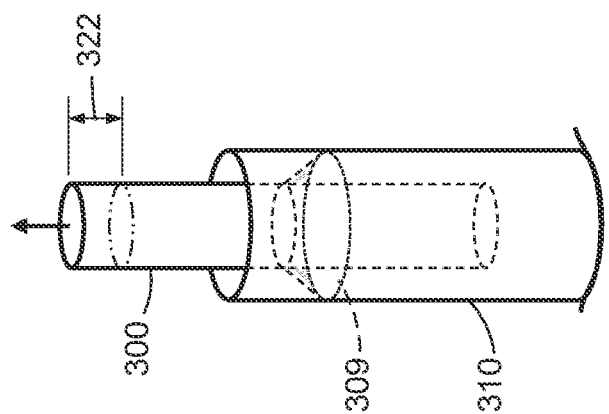
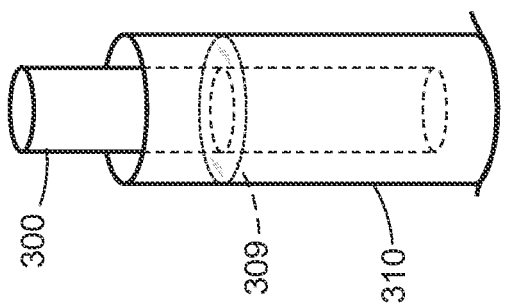
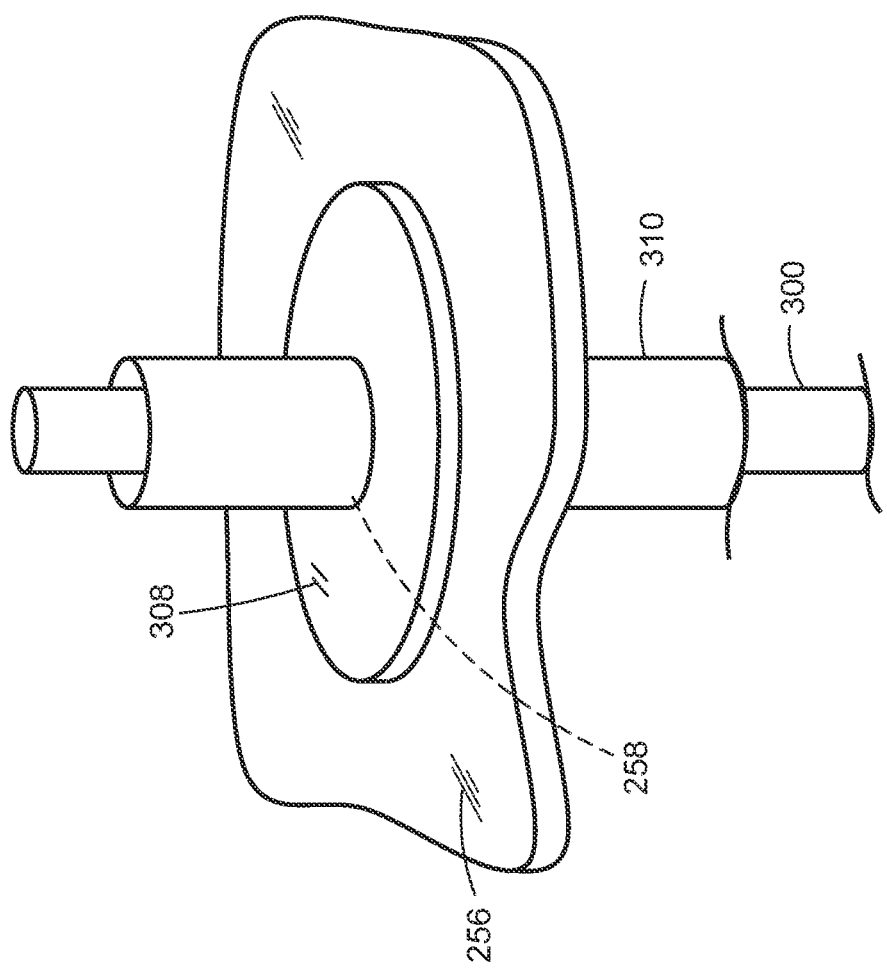
FIG. 9B
FIG. 9A
FIG. 8

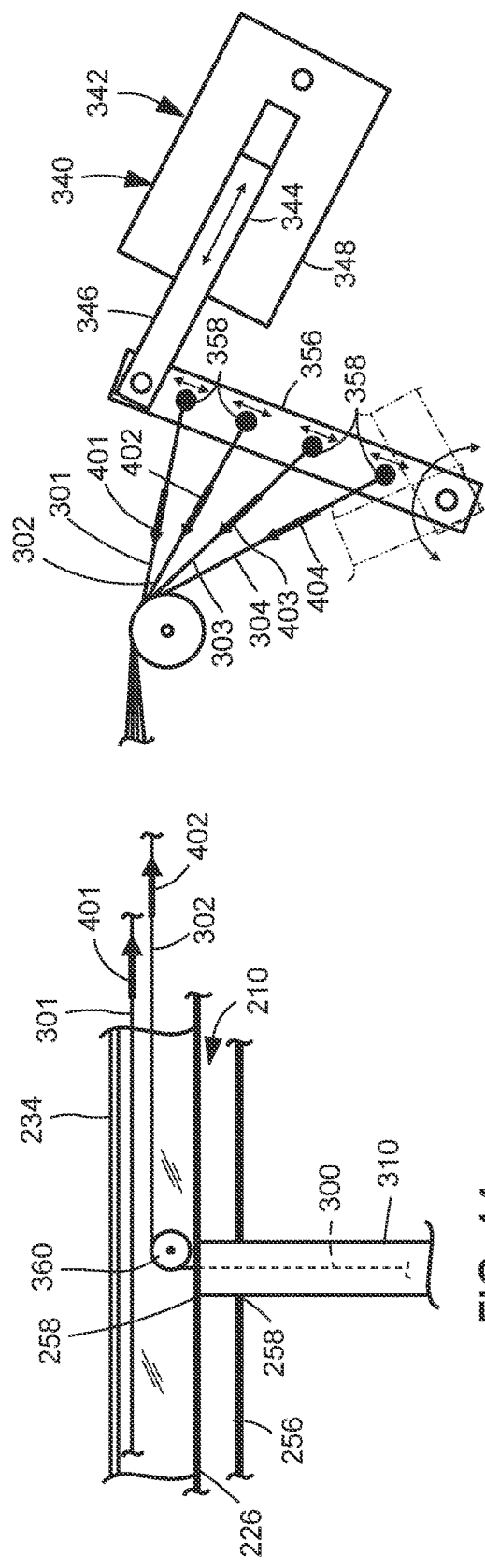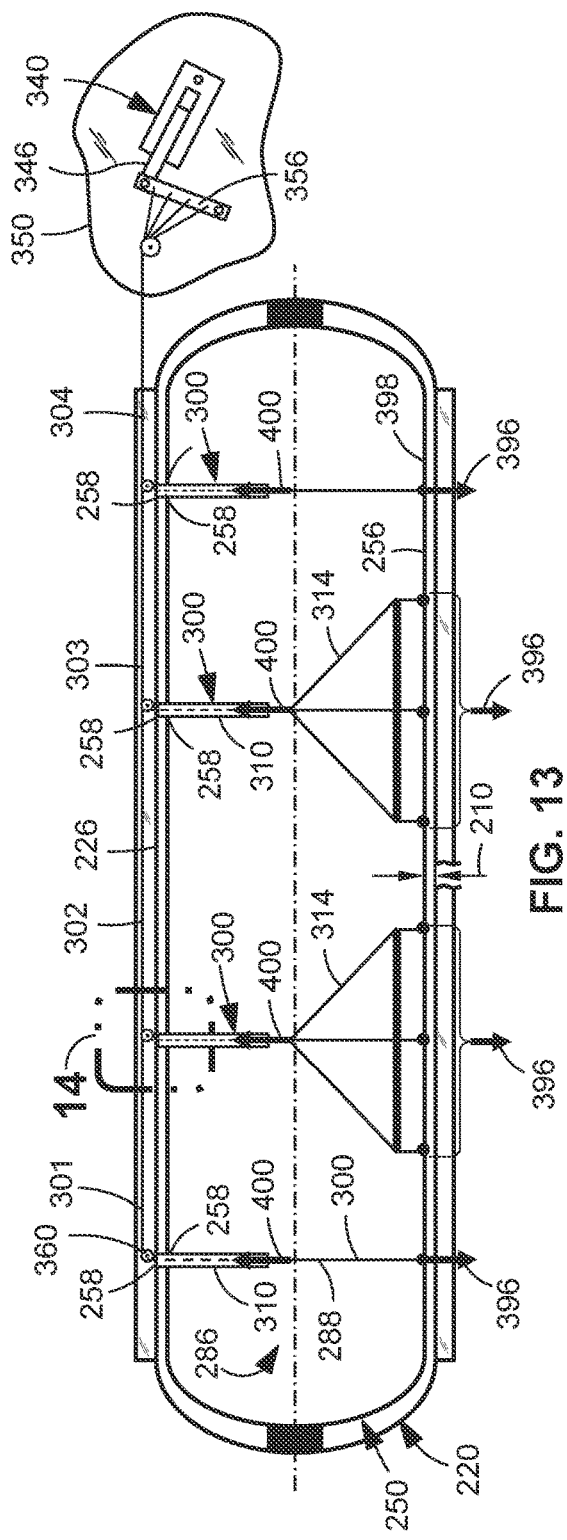

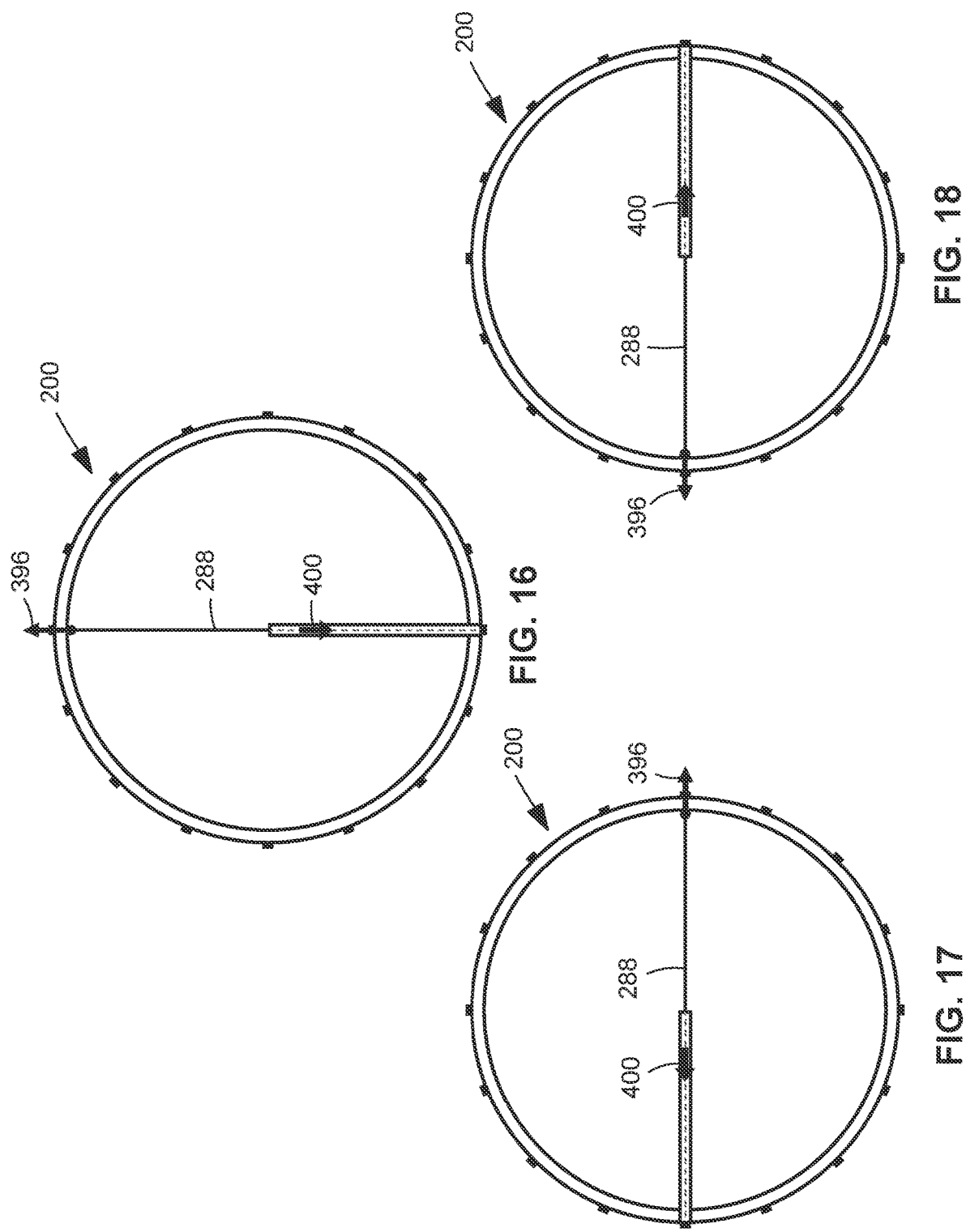

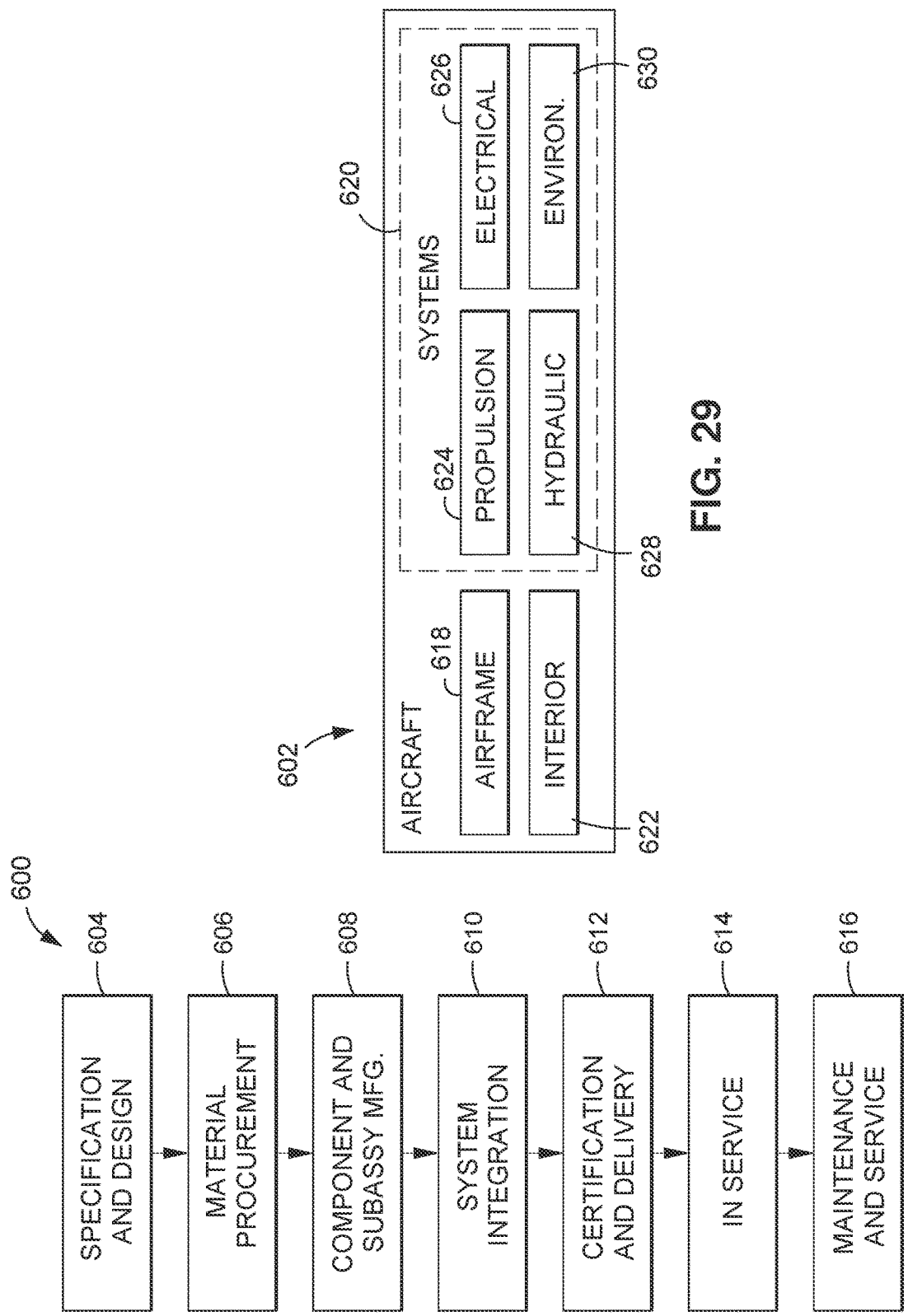

SYSTEM AND METHOD OF CONTROLLING THE DEFLECTIONS OF A PRESSURE TANK MOUNTED WITHIN A VACUUM TANK

CROSS-REFERENCE TO RELATED APPLICATIONS

This nonprovisional patent application is related to contemporaneously filed U.S. nonprovisional patent application Ser. No. 18/336,989, titled STRUCTURALLY INTEGRATED VACUUM TANK AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,991, titled SEGMENTED VACUUM JACKETED TANK SYSTEM AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,990, titled TANK SYSTEM HAVING REMOVABLE PLUG ASSEMBLY AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,992, titled SYSTEM AND METHOD OF CONTROLLING THE CIRCUMFERENCE OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

FIELD

The present disclosure relates generally to tank systems, and more particularly, to a tank system having a pressure tank mounted within a vacuum tank, and in which the deflections of the pressure tank are controlled in a manner preventing the pressure tank from contacting the vacuum tank when subjected to a load.

BACKGROUND

Vacuum jacketed tank systems are used for storing cryogenic fluid, such as liquid hydrogen and liquified natural gas. Such tank systems include an internal pressure tank, and an external vacuum tank which surrounds the internal pressure tank. To maintain the cryogenic fluid in liquid form and prevent it from transitioning into gaseous form due to conductive heat transfer from the relatively warm vacuum tank to the very cold pressure tank, a radial gap is maintained between the two tanks. The radial gap is under vacuum to prevent convective heat transfer from the vacuum tank to the pressure tank. In this regard, the radial gap between the two tanks defines a vacuum cavity that thermally insulates the pressure tank from relatively warm ambient air surrounding the vacuum tank.

Liquid hydrogen is an increasingly popular alternative to traditional hydrocarbon fuels as it produces no carbon dioxide ($CO_2$) emissions. Aircraft turbine engines can burn liquid hydrogen as a substitute for conventional jet fuels. However, liquid hydrogen has a relatively low density. As a result, hydrogen-powered aircraft typically need fuel tanks that have a significantly larger volume than that required by aircraft powered by conventional jet fuels. Given the large volume required, the fuselage is an optimal location for a vacuum jacketed tank system for storing liquid hydrogen.

During flight, an aircraft is subjected to a variety of loads of different magnitudes and directions. Flight loads transmitted to the fuselage will cause the pressure tank in a vacuum jacketed tank system to deflect. Large deflections of the pressure tank reduce the size of the radial gap between the pressure tank and the vacuum tank. If the deflections are large enough, the pressure tank can contact the vacuum tank, allowing thermal flow from the relatively warm vacuum tank to the relatively cold pressure tank, and potentially compromising the structural integrity of one or both tanks. To prevent this, the radial gap must be increased. However, increasing the radial gap reduces the diameter of the pressure tank and the amount of liquid hydrogen it can store. Stiffeners in the longitudinal direction can be added to the pressure tank to reduce bending to thereby reduce the size of the deflections. However, stiffeners increase the structural mass of the pressure tank, which reduces the payload capacity of the aircraft and increases fuel consumption.

As can be seen, there exists a need in the art for a vacuum jacketed tank system that reduces or eliminates deflections of the pressure tank relative to the vacuum tank when subjected to a load.

SUMMARY

The above-noted needs associated with vacuum jacketed tank systems are addressed by the present disclosure, which provides a tank system having a vacuum tank and a pressure tank. The vacuum tank has a vacuum tank main portion extending between vacuum tank end portions. The pressure tank is mounted within the vacuum tank, and has a pressure tank main portion extending between pressure tank end portions. The tank system includes a deflection control system for the pressure tank, comprising at least one elongate support member extending from a vacuum tank first side of the vacuum tank main portion, and through an opening in a pressure tank first side of the pressure tank main portion, and coupled to a pressure tank second side opposite the pressure tank first side. The elongate support member is configured to support the pressure tank main portion and reduce deflections of the pressure tank main portion relative to the vacuum tank main portion when the tank system is subjected to a load.

Also disclosed is an aircraft having a fuselage, and a tank system included with the fuselage. The vacuum tank has a vacuum tank main portion extending between vacuum tank end portions. The pressure tank is mounted within the vacuum tank, and has a pressure tank main portion extending between pressure tank end portions, and a pressure tank skin having a pressure tank outer surface. In addition, the tank system has a deflection control system for the pressure tank. The deflection control system comprises at least one elongate support member extending from a vacuum tank first side of the vacuum tank main portion, and through an opening in a pressure tank first side of the pressure tank main portion, and coupled to a pressure tank second side diametrically opposite the pressure tank first side. The elongate support member is configured to support the pressure tank main portion and reduce deflections of the pressure tank main portion relative to the vacuum tank main portion when the tank system is subjected to a load.

Additionally disclosed is a method of reducing deflections of a pressure tank mounted within a vacuum tank of a tank system. The method includes supporting, using at least one elongate support member, a pressure tank main portion of the pressure tank from a vacuum tank main portion of the vacuum tank in a manner such that when the tank system is subjected to a load, deflections of the pressure tank main portion relative to the vacuum tank main portion are reduced. In the tank system, the elongate support member extends from a vacuum tank first side of the vacuum tank main portion, and through an opening in a pressure tank first side of the pressure tank main portion, and is coupled to a pressure tank second side opposite the pressure tank first side.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 7 is a magnified view of the portion of the tank system identified by reference numeral 7 of FIG. 5 and illustrating the elongate support member configured as a support wire extending through a support wire sleeve, which passes through an opening in the pressure tank skin;

FIG. 8 is a magnified view of the portion of the tank system identified by reference numeral 8 of FIG. 7 and illustrating the support wire sleeve extending through a sleeve seal mounted in the opening in the pressure tank skin;

FIG. 9A is a magnified view of the portion of the tank system identified by reference numeral 9A of FIG. 7 and illustrating an example of a wire seal installed in the support wire sleeve for sealing around the support wire;

FIG. 9B shows the wire seal of FIG. 9A in a deflected position in which the seal accommodates axial movement of the support wire relative to the support wire sleeve;

FIG. 13 is a longitudinal section view of the tank system showing a plurality of support wires coupled to an actuator configured to adjust tension forces in the support wires by an amount to counteract stretching of the support wires due to a load on the tank system;

FIG. 14 is a magnified view of the portion of the tank system identified by reference numeral 14 of FIG. 13 and illustrating two of the support wires routed along a lengthwise direction of the vacuum tank;

FIG. 15 is a magnified view of four support wires originating from different locations along the length of the pressure tank and terminating at an actuator arm of the actuator;

FIG. 16 is an axial sectional view of an example of a tank system in which the elongate support members are oriented vertically for counteracting a vertical load directed upwardly;

FIG. 17 is an axial sectional view of an example of a tank system in which the elongate support members are oriented horizontally for counteracting a horizontal load directed toward the right;

FIG. 18 is an axial sectional view of an example of a tank system in which the elongate support members are oriented horizontally for counteracting a horizontal load directed toward the left;

FIG. 28 is an illustration of a flow diagram of an exemplary aircraft manufacturing and service method; and FIG. 29 is an illustration of an exemplary block diagram of an aircraft.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
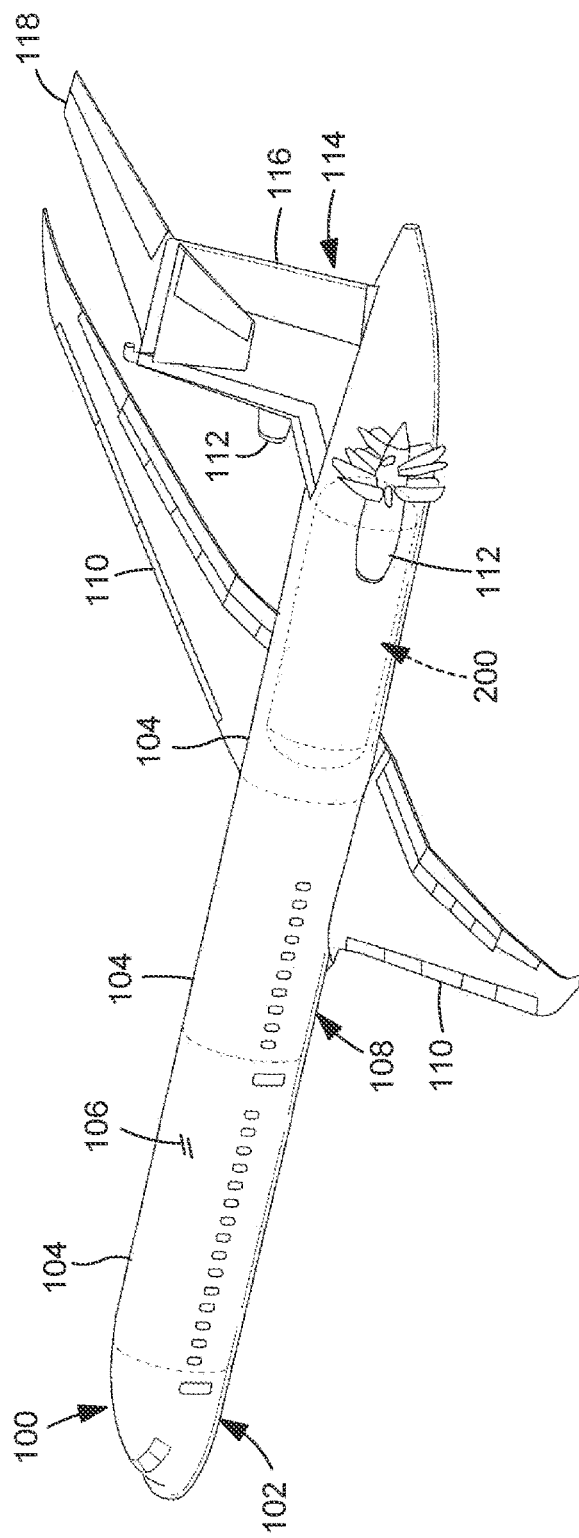
FIG. 1 shows an example of an aircraft having a vacuum jacketed tank system.
Figure 2:
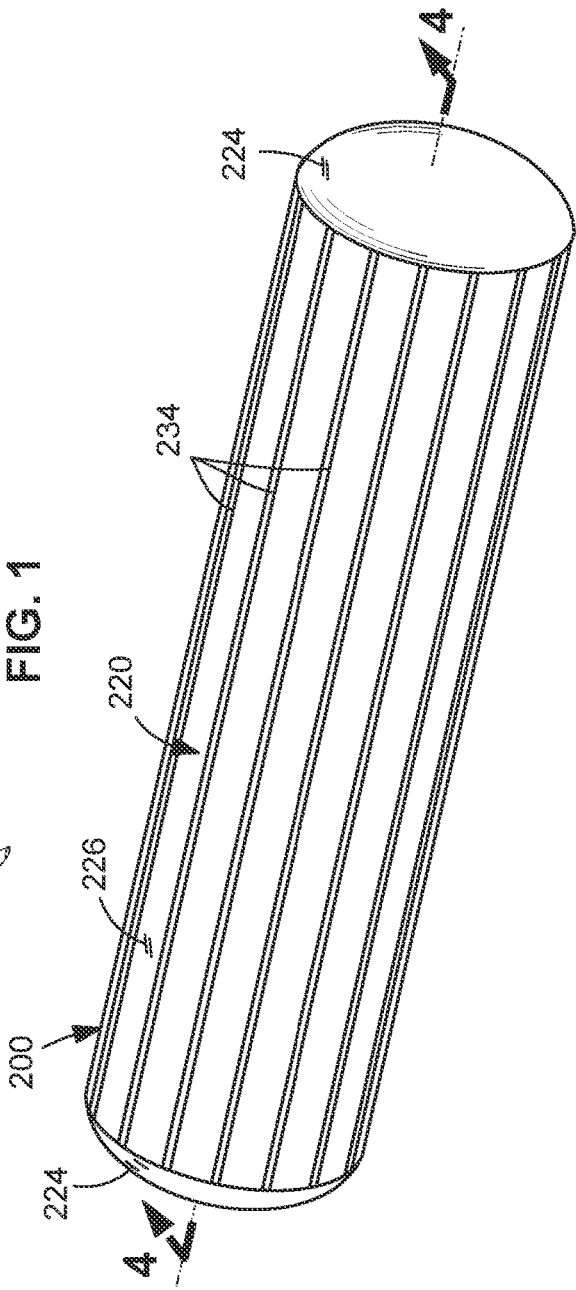
FIG. 2 is a perspective view of an example of the presently disclosed tank system.

Referring now to the drawings which illustrate various examples of the disclosure, shown in FIG. 1 is an example of an aircraft 100 containing a vacuum jacketed tank system 200 as disclosed herein. The vacuum jacketed tank system 200 is also be referred to throughout the present disclosure as a tank system 200. In FIG. 1, the aircraft 100 includes a fuselage 102 having an empennage 114. The empennage 114 includes a vertical tail 116 (i.e., a vertical fin and a rudder) and a horizontal tail 118 (e.g., a horizontal stabilizer and elevators). In addition, the aircraft 100 includes a pair of wings 110 and a pair propulsion units 112 which, in the example shown, are mounted on opposite sides of the fuselage 102 near the empennage 114.

In the example shown, the fuselage 102 is comprised of a plurality of fuselage barrel sections 104 joined end to end. The fuselage barrel sections 104 each include a fuselage external skin 106 which functions as the external aerodynamic surface of the fuselage 102. The presently disclosed tank system 200 can be structurally integrated with one or more of the fuselage barrel sections 104. In the example shown, the tank system 200 is structurally integrated with the fuselage barrel section 104 located immediately aft of the cabin 108, which can be configured to contain passengers and/or cargo. Although described in the context of an aircraft 100, the presently disclosed tank system 200 can be implemented in any one of a variety of alternative vehicular applications, including, but not limited to any type of fixed-wing aircraft or rotary-wing aircraft, any type of watercraft, and any type of land-based vehicle including trains, automobiles, buses, and trucks.

Referring to FIGS. 2-6, the tank system 200 is comprised of an internal pressure tank 250 mounted within an external vacuum tank 220 in a manner such that there is a radial gap 210 (FIGS. 4-5) between the pressure tank 250 and the vacuum tank 220. The pressure tank 250 is configured to contain cryogenic fluid such as liquid hydrogen, liquefied natural gas (LNG), or any other cryogenic fluid. In the example of an aircraft 100, the cryogenic fluid (e.g., liquid hydrogen or LNG) can be burned in propulsion units configured as turbine engines. Alternatively, the aircraft 100 can include a fuel cell (not shown) for converting liquid hydrogen or LNG into electricity for powering electric propulsion units. The pressure tank 250 must be kept at a very low temperature (e.g., −162 degrees Celsius for LNG; −253 degrees Celsius for liquid hydrogen) in order to maintain the cryogenic fluid in liquid form at a reasonable internal pressure (e.g., 25 psi at limit load; 37.5 psi at ultimate load). The primary stresses in the pressure tank 250 are tension stresses in the longitudinal or lengthwise direction, and in the hoop or circumferential direction.

The vacuum tank 220 is under vacuum pressure, resulting in a vacuum cavity 208 (FIGS. 4-5) in the radial gap 210 which extends circumferentially between the pressure tank 250 and the vacuum tank 220. The vacuum cavity 208 thermally insulates the pressure tank 250 from relatively warm ambient air 206 (FIG. 5) surrounding the vacuum tank 220. In this regard, the vacuum cavity 208 reduces or prevents heat transfer into the cold pressure tank 250 from the relatively warm ambient air 206 surrounding the vacuum tank 220, and thereby reduces or prevents the cryogenic fluid from transitioning into gaseous form. The vacuum tank 220 is under external pressure because of the pressure difference between the vacuum cavity 208 and external air pressure acting on the vacuum tank 220. As a result, the primary stresses on the vacuum tank 220 are compression stresses in the longitudinal or lengthwise direction, and in the hoop or circumferential direction.

Figure 3:
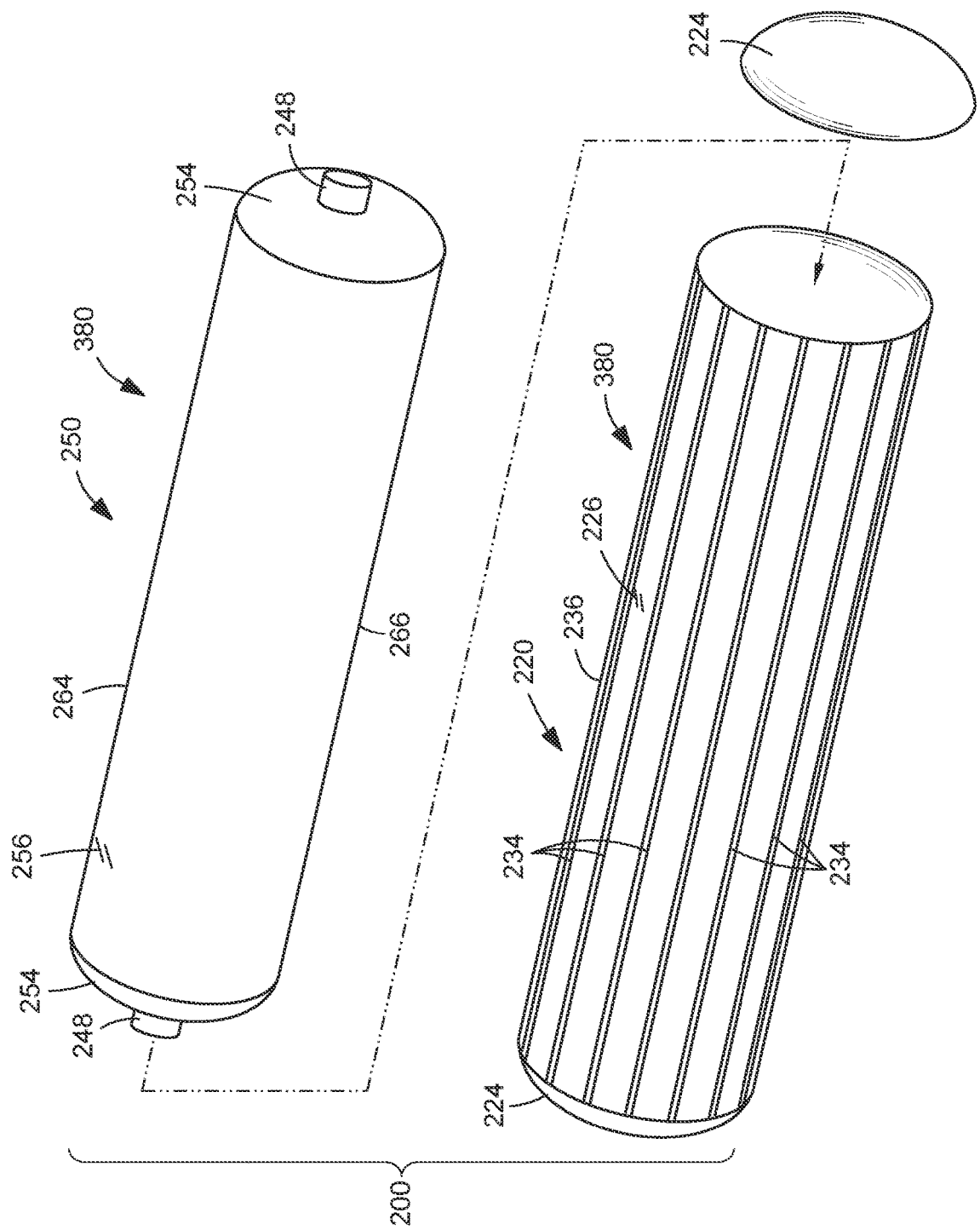
FIG. 3 is an exploded view of the tank system of FIG. 2 comprising a vacuum tank, and a pressure tank configured to be mounted within the vacuum tank.
Figure 4:
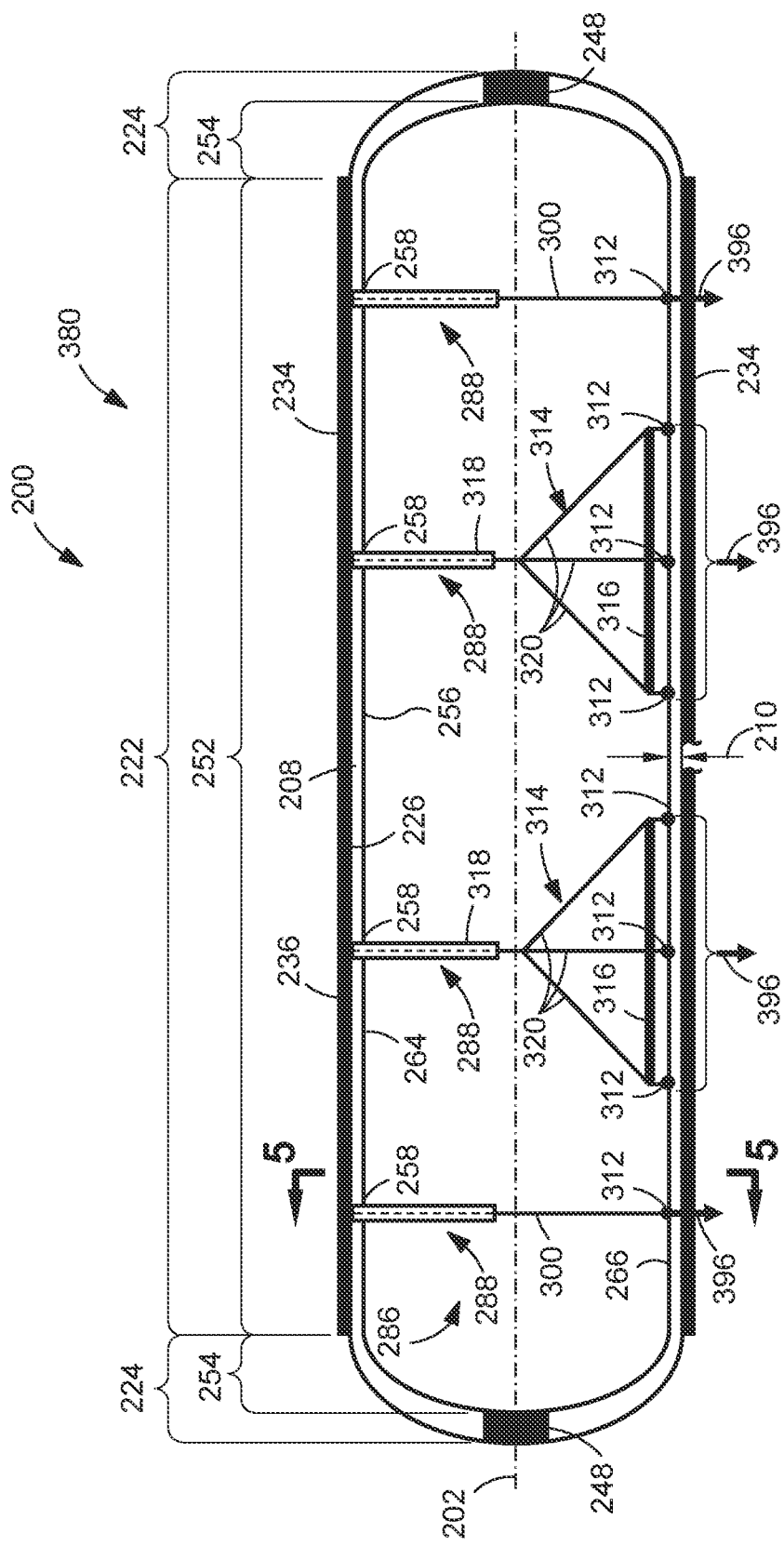
FIG. 4 is a longitudinal section view of the tank system of FIGS. 2-3 showing a deflection control system for reducing deflections of the pressure tank relative to the vacuum tank.

In the example of FIGS. 3-4, the pressure tank 250 is mounted within the vacuum tank 220 via a tank attach fitting 248 at each end of the tank system 200. In the example shown, each tank attach fitting 248 is centered on the tank axis 202 (FIG. 4), and each tank attach fitting 248 extends between a vacuum tank end portion 224 and a pressure tank end portion 254.

Figure 5:
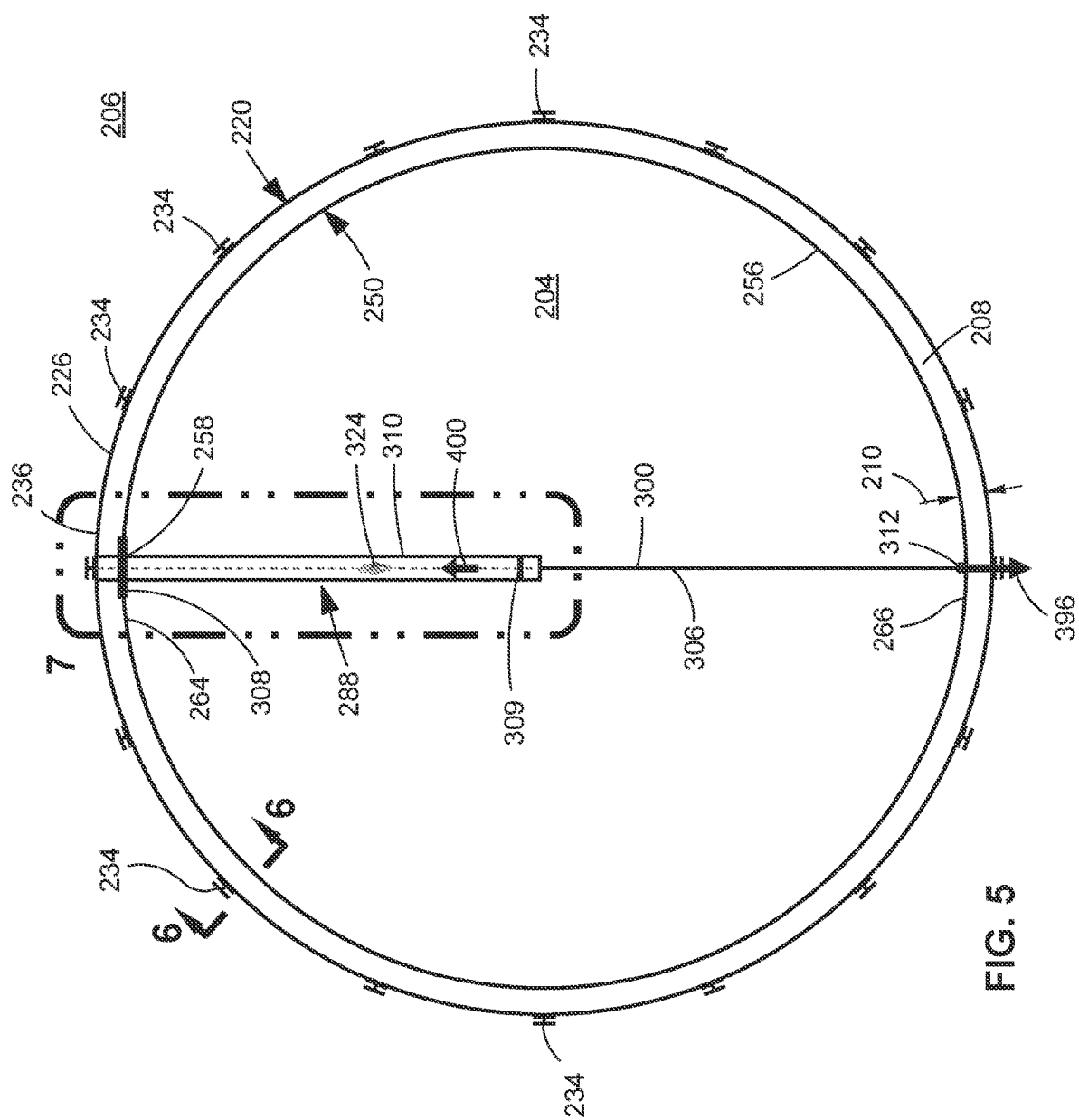
FIG. 5 is an axial sectional view of the tank system of FIG. 4 illustrating a radial gap extending circumferentially between the pressure tank skin and the vacuum tank skin, and further illustrating the deflection control system comprising an elongate support member extending from a vacuum tank first side (e.g., the vacuum tank top side) to a pressure tank second side (e.g., the pressure tank bottom side) for counteracting a vertical load directed downwardly on the tank system.
Figure 6:
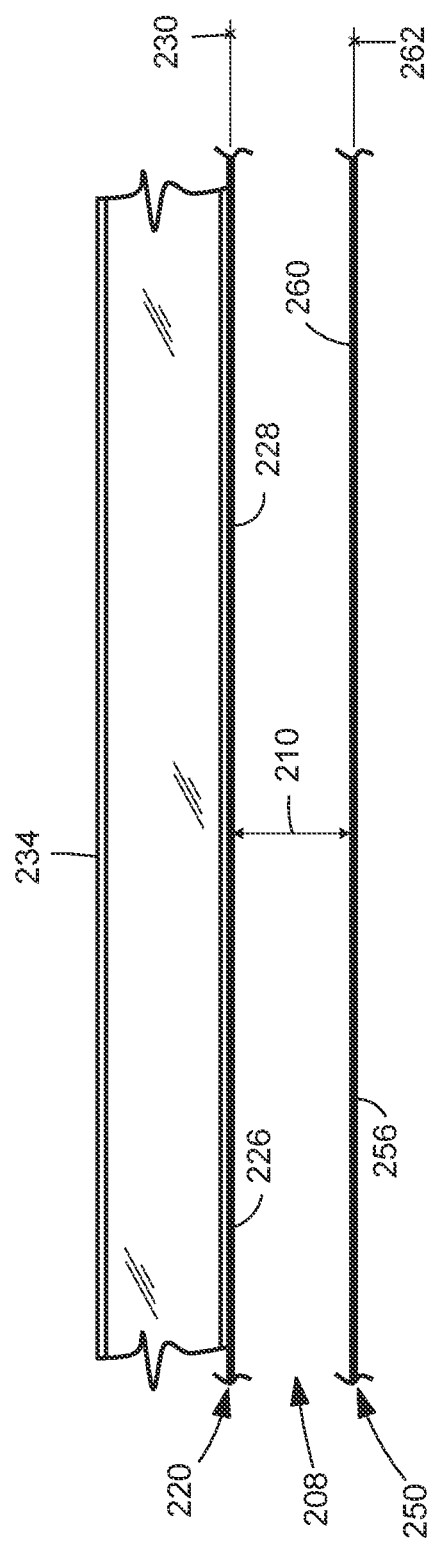
FIG. 6 is a sectional view taken along line 6-6 of FIG. 5 and illustrating an example of the pressure tank skin and the vacuum tank skin each having a straight cross section in the longitudinal or lengthwise direction.

Referring to FIGS. 2-6, the vacuum tank 220 and the pressure tank 250 each have a sphero-cylindrical shape. The vacuum tank 220 has a vacuum tank main portion 222 (FIG. 4) extending between the vacuum tank end portions 224 (FIG. 4). The vacuum tank main portion 222 has a vacuum tank skin 226 (FIG. 5). For examples where the tank system 200 is integrated into an aircraft 100 (e.g., FIG. 1), the vacuum tank skin 226 can function as the external aerodynamic surface of the fuselage 102. Alternatively, the vacuum tank 220 can optionally be supported by a fuselage structure (not shown), such as a semi-monocoque structure, that also functions as the external aerodynamic surface of the fuselage 102.

Figure 19:
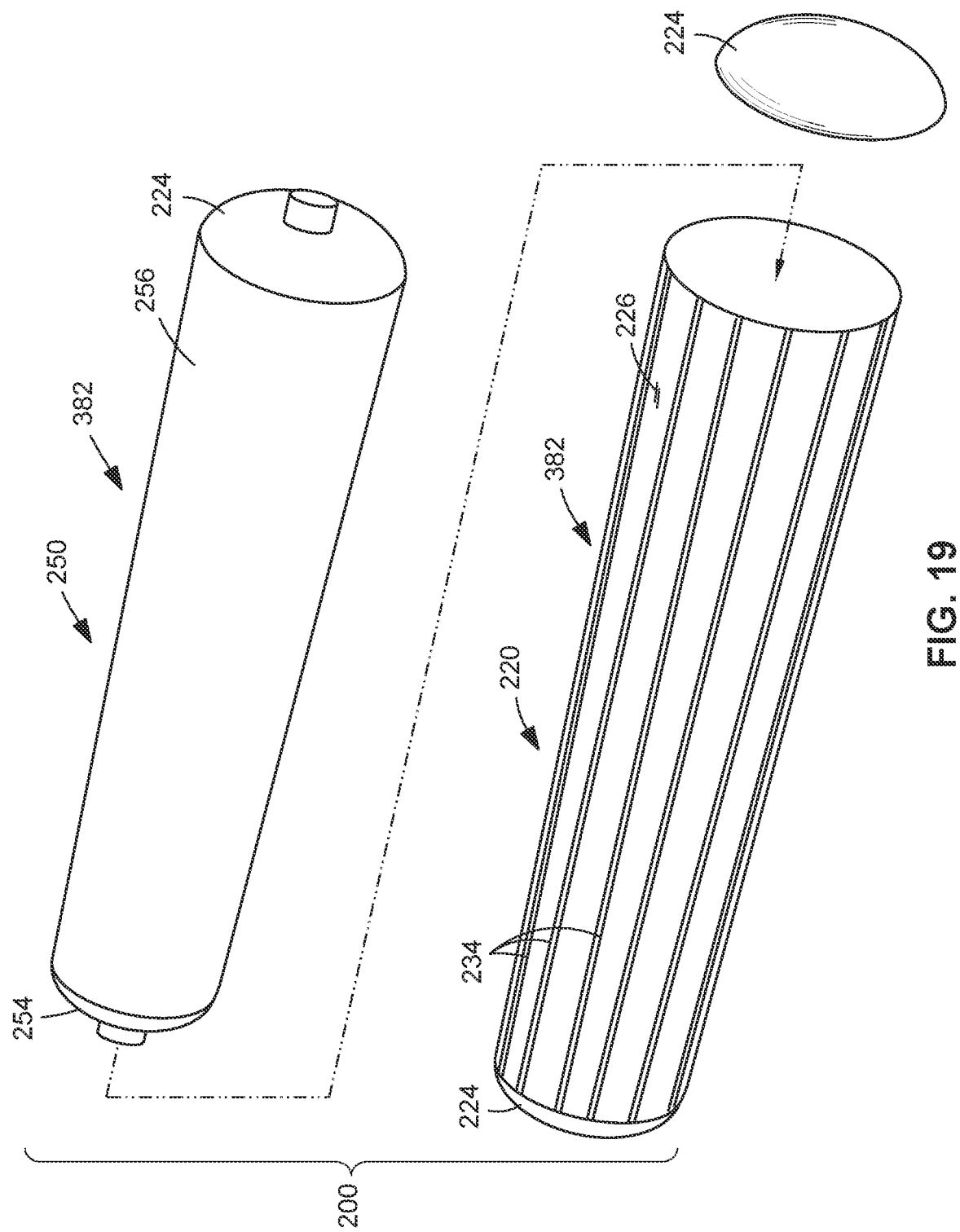
FIG. 19 is an exploded view of the tank system in an example in which the pressure tank and the vacuum tank each have a straight skin and a tapered cylindrical shape.

In the example of FIGS. 2-6, the vacuum tank main portion 222 has a straight cylindrical shape 380 (FIG. 3). However, in other examples, the vacuum tank 220 can have a tapered cylindrical shape 382 as shown in FIG. 19 and described below. In FIGS. 2-6, the vacuum tank end portions 224 are shown having a hemispherical or semi-ellipsoid shape. However, in other examples not shown, the vacuum tank end portions 224 can be planar or flat, or the vacuum tank end portions 224 can have an inverted hemispherical or semi-ellipsoid shape, or any one of a variety of other shapes.

Figure 20:
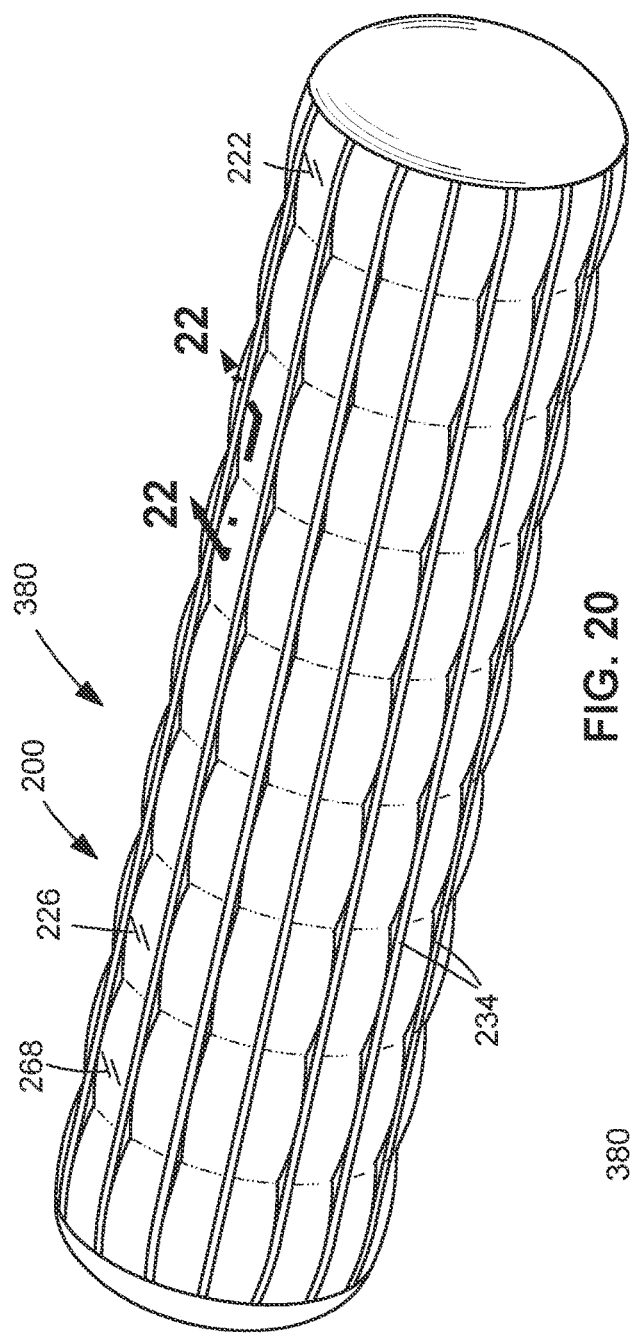
FIG. 20 is a perspective view of an example of a tank system in which the pressure tank skin and the vacuum tank skin each having a scalloped cross section in the longitudinal or lengthwise direction.
Figure 21:
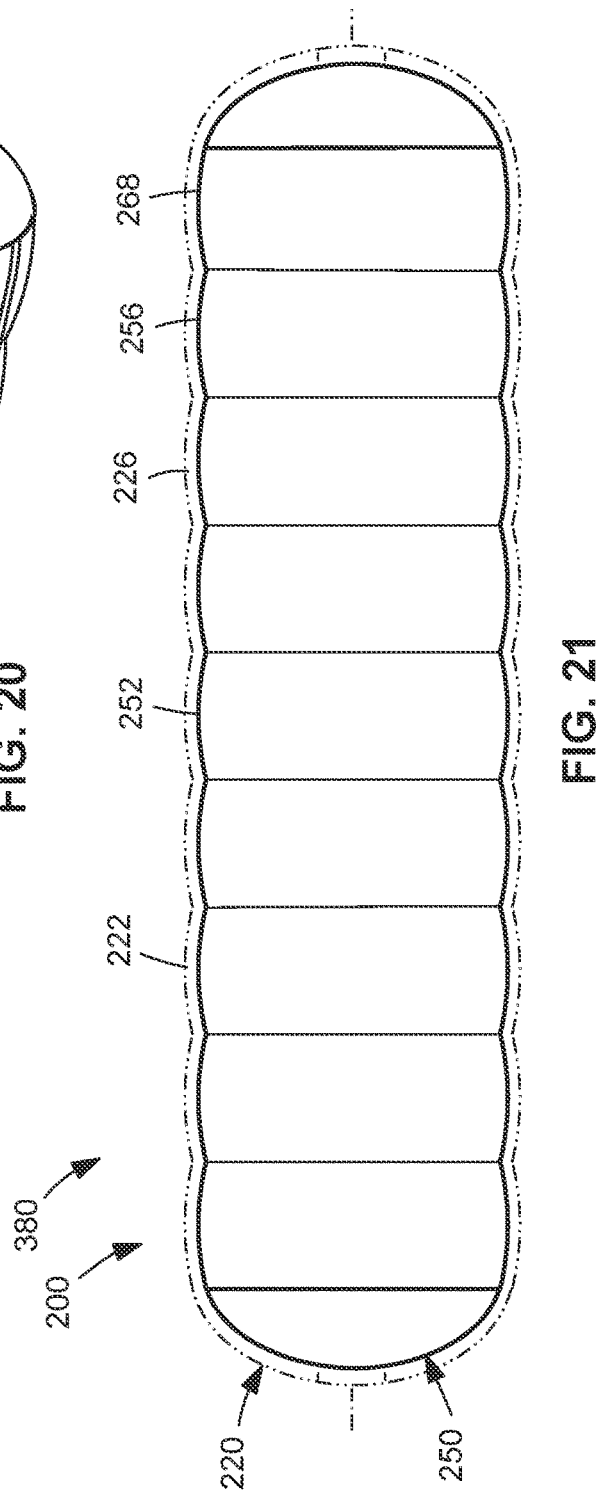
FIG. 21 is a side view of the tank system of FIG. 20 illustrating the profile of the vacuum tank skin in phantom lines.
Figure 22:
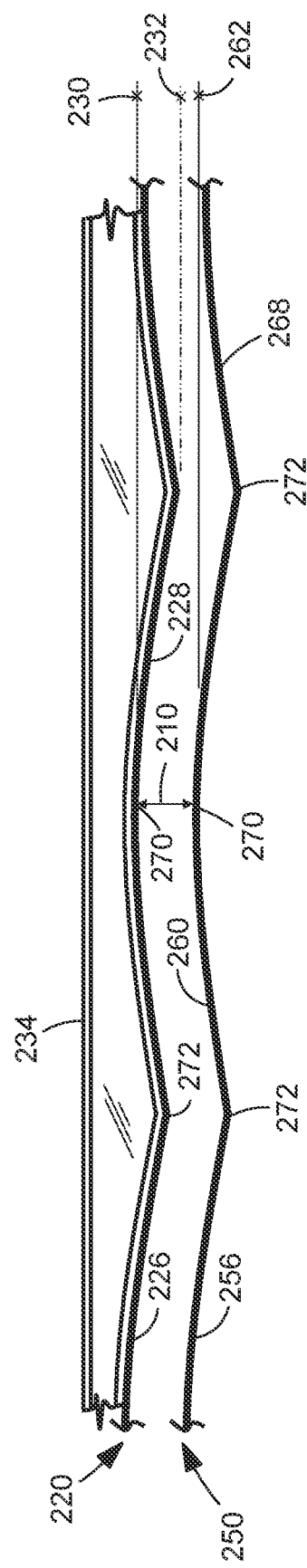
FIG. 22 is a sectional view taken along line 22-22 of FIG. 20 and illustrating the scalloped cross section of the pressure tank skin and the vacuum tank skin.
Figure 23:
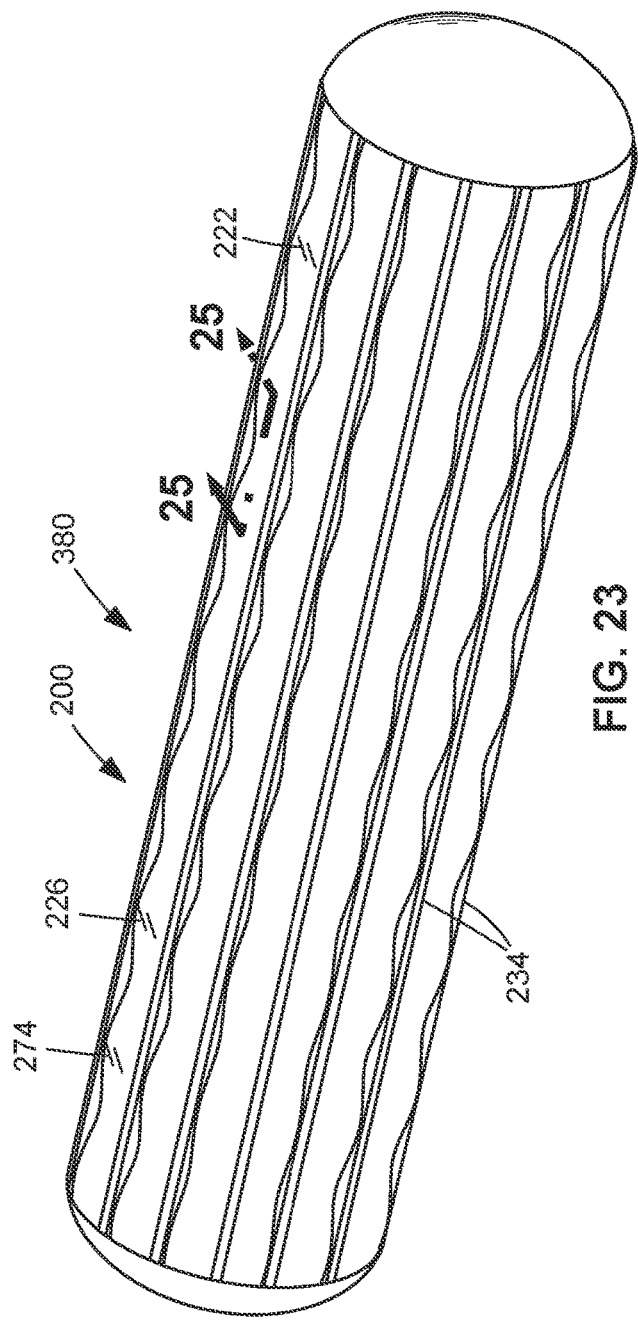
FIG. 23 is a perspective view of an example of a tank system in which the pressure tank skin and the vacuum tank skin each having a sinusoidal cross section in the longitudinal or lengthwise direction.
Figure 24:
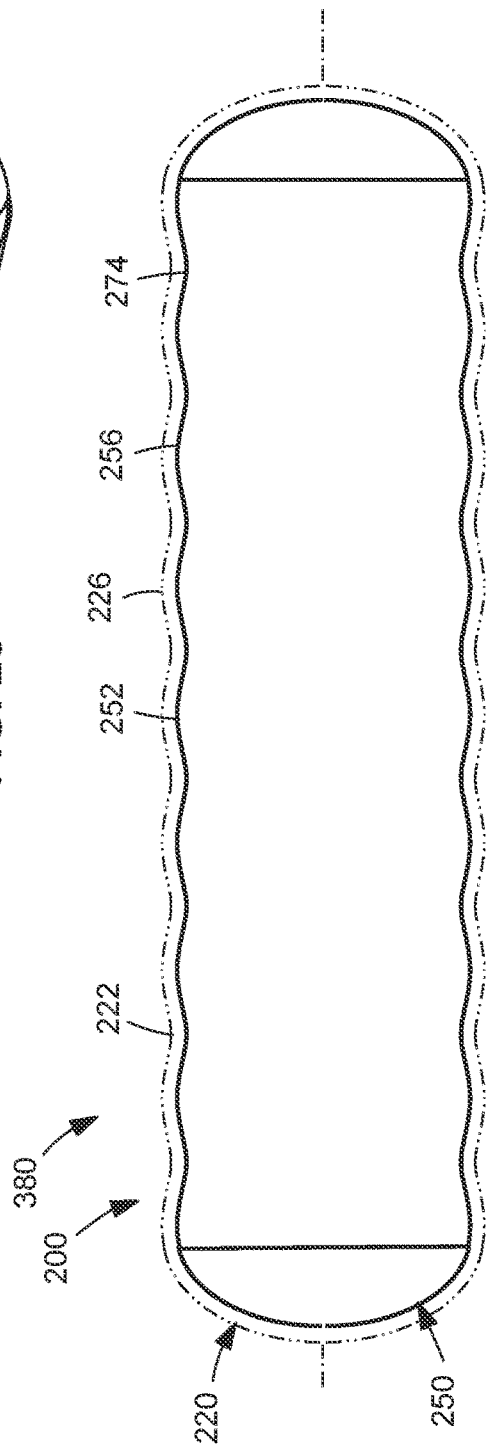
FIG. 24 is a side view of the tank system of FIG. 22 illustrating the profile of the vacuum tank skin in phantom lines.
Figure 25:
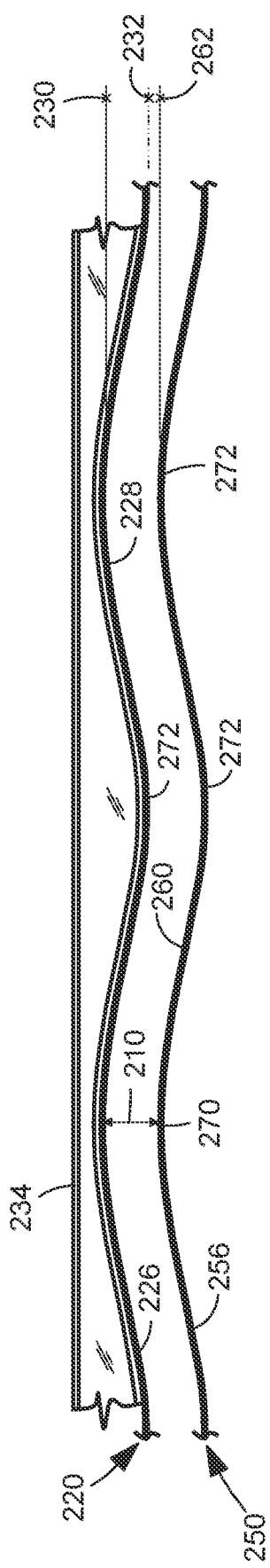
FIG. 25 is a sectional view taken along line 25-25 of FIG. 23 and illustrating the sinusoidal cross section of the pressure tank skin and the vacuum tank skin.

The pressure tank 250 is shaped complementary to the vacuum tank 220 to maximize volumetric efficiency for storing cryogenic fluid. The pressure tank 250 of FIGS. 2-6 has a pressure tank main portion 252 (FIG. 4). The pressure tank main portion 252 has a pressure tank skin 256. In the example shown, the pressure tank main portion 252 has a straight cylindrical shape 380 which extends between the pressure tank end portions 254, and the pressure tank skin 256 has a straight cross section in the longitudinal or lengthwise direction. However, in other examples, the pressure tank skin 256 of the pressure tank main portion 252 has a scalloped cross section 268 in the lengthwise direction as shown in FIGS. 20-22 and described below, or a sinusoidal cross section 274 in the lengthwise direction as shown in FIGS. 23-25 and described below, or the pressure tank skin 256 can have other cross-sectional shapes in the lengthwise direction. The cross-sectional shape of the skins 226, 256 is not material to the working of the presently disclosed tank system 200. Regardless of the cross-sectional shape of the skins 226, 256, the pressure tank outer surface 260 of the pressure tank skin 256 and the vacuum tank inner surface 228 of the vacuum tank skin 226 are preferably complementary (e.g., identical) to each other. In FIGS. 2-6, the pressure tank end portions 254 are shown having a hemispherical or semi-ellipsoid shape. However, the pressure tank end portions 254 can be planar or flat, or the pressure tank end portions 254 can have an inverted hemispherical or semi-ellipsoid shape, or other shape.

The pressure tank 250 is preferably formed of a material capable of withstanding the extremely low temperatures required for storing cryogenic fluid. For example, the material of the pressure tank 250 has suitable mechanical properties at temperatures as low as −162 degrees Celsius for storing LNG, or as low as −253 degrees Celsius for storing liquid hydrogen. In one example, the pressure tank 250 and/or the vacuum tank 220 can be formed of a metallic material such as steel, stainless steel, aluminum, titanium, copper, or other metallic materials or alloys thereof. Alternatively or additionally, the pressure tank 250 and/or the vacuum tank 220 can be formed of a suitable fiber-reinforced polymer matrix material (i.e., composite material) such as carbon fiber reinforced polymer (CFRP). The pressure tank 250 and the vacuum tank 220 may be formed of the same materials or of different materials.

In the example of FIGS. 2-6, the vacuum tank 220 is shown having vacuum tank skin stiffeners 234 coupled to the vacuum tank skin 226. The vacuum tank skin stiffeners 234 are located at spaced intervals around the circumference. The vacuum tank skin stiffeners 234 extend along the length of the vacuum tank main portion 222, and increase the axial stiffness of the vacuum tank skin 226 in the longitudinal or lengthwise direction. For examples where the tank system 200 is structurally integrated into an aircraft fuselage 102 such as one of the fuselage barrel sections 104 (e.g., FIG. 1), the axial stiffness of the vacuum tank skin stiffeners 234 enables the fuselage 102 to carry fuselage bending moments. In the example shown, the vacuum tank skin stiffeners 234 are located on the external side of the vacuum tank skin 226. However, the vacuum tank skin stiffeners 234 may be located on the internal side, or on both the internal side and the external side of the vacuum tank skin 226. In still further examples not shown, the vacuum tank skin stiffeners 234 can be omitted from the vacuum tank 220.

Referring to FIGS. 4-5 and 7-8, the tank system 200 has a deflection control system 286 for reducing or eliminating deflections of the pressure tank 250 relative to the vacuum tank 220 in the radial direction when the tank system 200 is subjected to a load 396 (FIGS. 4-5). The deflection control system 286 comprises at least one elongate support member 288 extending from a vacuum tank first side 236 of the vacuum tank 220, and passing through an opening 258 (FIGS. 7-8) in a pressure tank first side 264 of the pressure tank main portion 252, and terminating at a pressure tank second side 266 opposite the pressure tank first side 264. The one or more elongate support members 288 are configured to support the pressure tank main portion 252 and reduce deflections of the pressure tank main portion 252 relative to the vacuum tank main portion 222 in the radial direction when the tank system 200 is subjected to a load 396. In this regard, the deflection control system 286 is configured to maintain the radial gap 210 (FIGS. 4-5) between the pressure tank 250 and the vacuum tank 220 when the tank system 200 is subjected to a load 396, and thereby reduce or prevent contact between the pressure tank 250 and the vacuum tank 220, which would otherwise allow thermal flow from the relatively warm vacuum tank 220 to the relatively cold pressure tank 250. In some examples, brief periods of contact (e.g., less than several seconds) between the pressure tank 250 and the vacuum tank 220 may be acceptable.

The deflection control system 286 is configured to reduce or eliminate deflections of the pressure tank 250 otherwise caused by any one or more of a variety of different types of loads 396. For example, the deflection control system 286 is configured to reduce or eliminate deflections of the pressure tank 250 otherwise caused by a static load. One example of a static load is the constant vertically downward force on the pressure tank 250 caused by the gravitational pull on the structural mass of the pressure tank 250 and the mass of the cryogenic fluid it contains. Alternatively or additionally, the deflection control system 286 is configured to reduce or eliminate deflections of the pressure tank 250 otherwise caused by inertial loads. In one example, an inertial load can be a temporary or short-duration load. In the example of an aircraft 100, inertial loads can include maneuvering loads, gust loads, loads due to turbulence, landing loads, and/or other loads.

Each elongate support member 288 can be provided as one or more support wires 300, cables, rods, or any one of a variety of other elongate member configurations capable of supporting the pressure tank 250 from the vacuum tank 220 in a manner reducing or eliminating deflections of the pressure tank main portion 252 relative to the vacuum tank main portion 222 when the tank system 200 is subjected to a load 396. In some examples, the deflection control system 286 comprises a plurality of support wires 300 extending from spaced locations along the vacuum tank first side 236 to a respectively plurality of wire attachment points 312 at spaced locations along the pressure tank second side 266. In a deflection control system 286 having a plurality of support wires 300, each of the support wires 300 carries a portion of the load 396 on the pressure tank 250.

In the example of FIGS. 4-5, the deflection control system 286 has four elongate support members 288 each configured to carry a portion of the load 396 on the pressure tank 250. Two of the elongate support members 288 are respectively located proximate the outboard ends of the pressure tank 250, and are each configured as a single support wire 300 that extends vertically from the vacuum tank top side (i.e., the vacuum tank first side 236), passing through an opening 258 in the pressure tank top side (i.e., the pressure tank first side 264), and terminating at a wire attachment point 312 on the pressure tank bottom side (i.e., the pressure tank second side 266) diametrically opposite the location where the support wire 300 is coupled to the vacuum tank top side, as shown in FIG. 5. The two remaining elongate support members 288 are configured as support wire assemblies 314 and are located between the two outboard elongate support members 288.

In some examples, the elongate support member 288 comprises a support wire assembly 314. Each support wire assembly 314 comprises a primary support wire 300, a plurality of secondary support wires 320, and a spreader bar 316. The primary support wire 318 is coupled to the vacuum tank first side 236 and passes through an opening 258 in the pressure tank skin 256, and extends into the pressure tank 250. In the example shown, each primary support wire 318 terminates at a vertical location near the tank axis 202 (e.g., the tank centerline). However, in other examples not shown, the primary support wire 318 can terminate at any vertical location within the pressure tank 250.

The secondary support wires 320 extend from the primary support wire 318 to spaced positions along the spreader bar 316, and from the spreader bar 316 to spaced wire attachment points 312 along the pressure tank second side 266. The spreader bar 316 is positioned a relatively short distance above the pressure tank second side 266 (e.g., the pressure tank bottom side), and is oriented parallel to the tank axis 202. By extending the secondary support wires 320 from the spreader bar 316 to different wire attachment points 312, a longer section of the pressure tank 250 can be substantially uniformly supported than is achievable using a single wire extending from the vacuum tank first side 236 to a single wire attachment point 312 on the pressure tank second side 266. By using the spreader bar 316 to space apart the secondary support wires 320, the arrangement avoids localized compressive forces in the portions of the pressure tank 250 between the wire attachment points 312 of the second support wires 300, which may otherwise occur if the secondary support wires 320 extended directly from the primary support wire 318 to their respective wire attachment points 312. Although FIG. 4 shows each support wire assembly 314 having three secondary support wires 320 extending from each primary support wire 318, a support wire assembly 314 can have any number of secondary support wires 320 extending from the primary support wire 318. Furthermore, a deflection control system 286 can have any number of support wires 300, and is not limited to the arrangement shown in FIG. 4.

In any of the examples disclosed herein, the support wires 300 are configured to provide enough stiffness to reduce or prevent deflections of the pressure tank 250 when filled with cryogenic fluid and subjected to a load 396 such as a static load and/or an inertial load. The support wires 300 can be formed of metallic material such as steel, stainless steel, aluminum, titanium, copper, or other metallic materials or alloys thereof. Alternatively or additionally, the support wires 300 can be formed of non-metallic material such as fiber-reinforced polymer matrix material (i.e., composite material) such as carbon fiber reinforced polymer (CFRP). In one example, the support wires 300 can be formed of boron, which has a relatively high modulus of elasticity (e.g., 30 msi), and a relatively low density (0.077 lb/in$^3$). However, the support wires 300 can be formed of any metallic and/or non-metallic material having the desired stiffness characteristics at the low temperature required for storing LNG (e.g., −162 degrees Celsius) or the low temperature required for storing liquid hydrogen (e.g., −253 degrees Celsius).

Referring to FIGS. 4-5 and 7, each support wire 300, including the primary support wires 318 and the secondary support wires 320, can have a thermally insulative coating 306 at least along the lengthwise section of the support wire 300 that extends into the pressure tank 250. The thermally insulative coating 306 is configured to reduce thermal flow into the support wire 300 from cryogenic fluid in the pressure tank 250. In one example, the thermally insulative coating 306 can be a polymeric coating formed of one or more materials having a relatively low thermal conductance.

Referring to FIGS. 7-8, the deflection control system 286 includes a sleeve seal 308 mounted in each opening 258 in the pressure tank first side 264 (e.g., the pressure tank top side). In addition, the deflection control system 286 includes a support wire sleeve 310 that extends through the sleeve seal 308 and surrounds at least a lengthwise section of the support wire sleeve 310 that extends into the pressure tank 250. The seal thickness and seal inside diameter around the support wire sleeve 310 are sized to allow axial movement between the support wire sleeve 310 and the pressure tank skin 256, while also carrying the pressure tank 250 internal pressure 204 (FIG. 5) in a direction normal to the outer surface of the support wire sleeve 310. The sleeve seal 308 can be formed of any metallic or non-metallic material having the above-noted sealing characteristics at the low temperatures required for storing LNG, liquid hydrogen, or other cryogenic fluid.

In the example of FIGS. 5 and 7, the upper end of the support wire sleeve 310 is butted (e.g., sealed) against the vacuum tank skin 226, and the lower end of the support wire sleeve 310 is located near the tank axis 202 (FIG. 4). However, in other examples not shown, the upper end of the support wire sleeve 310 can terminate a short distance from the vacuum tank skin 226, and the lower end of the support wire sleeve 310 can terminate at any vertical location within the pressure tank 250. The lower end of the support wire sleeve 310 can be sealed with foam around the support wire 300 where it exits the support wire sleeve 310 to prevent cryogenic fluid from entering the support wire sleeve 310.

Alternatively or additionally, a wire seal 309 can be installed in the lower end of the support wire sleeve 310 for sealing around the support wire 300 where it exits the lower end of the support wire sleeve 310, as shown in FIGS. 7 and 9A-9B. The wire seal 309 can be a flexible non-structural seal that provides a pressure barrier between the vacuum pressure in the support wire sleeve 310 and the internal pressure in the pressure tank 250. The wire seal 309 accommodates wire deflection 322 (FIG. 9B) of the support wire 300 relative to the support wire sleeve 310, as may occur due to stretching of the support wire 300 and/or deflection of the pressure tank 220 relative to the vacuum tank 250.

The support wire sleeve 310 is configured to reduce thermal flow into the support wire 300 from cryogenic fluid in the pressure tank 250. In this regard, the diameter of the support wire sleeve 310 is slightly larger (e.g., 0.10 inch) than the support wire 300 to provide a small circumferential gap between the support wire sleeve 310 and the support wire 300. The small circumferential gap can further reduce thermal flow into the support wire 300 from cryogenic fluid in the pressure tank 250. The support wire sleeve 310 has a wall thickness that is sized to withstand the internal pressure 204 of the pressure tank 250 against the exterior of the support wire sleeve 310 with vacuum pressure on the inside of the support wire sleeve 310. The vacuum between the support wire 300 and the support wire sleeve 310 reduces or prevents conductive, convective, and/or radiative heat transfer from the length of the support wire 300 to the surrounding support wire sleeve 310. Advantageously, the long length of the support wires 300 (relative to conventional tank supports of an inch or less in length) further reduces thermal flow between the support wire 300 and the support wire sleeve 310.

Figure 12:
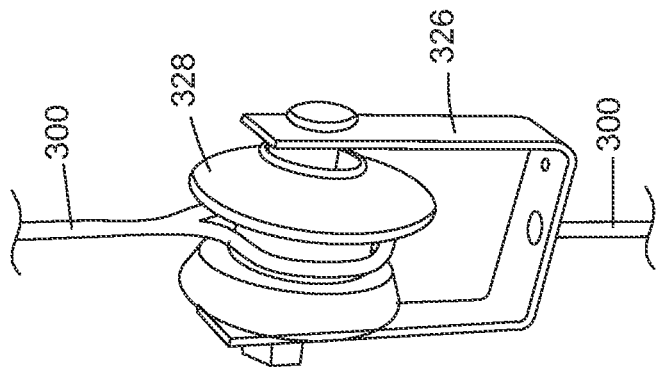
FIG. 12 shows yet another example of a thermal isolator that can be installed in line with the support wire.
Figure 11:
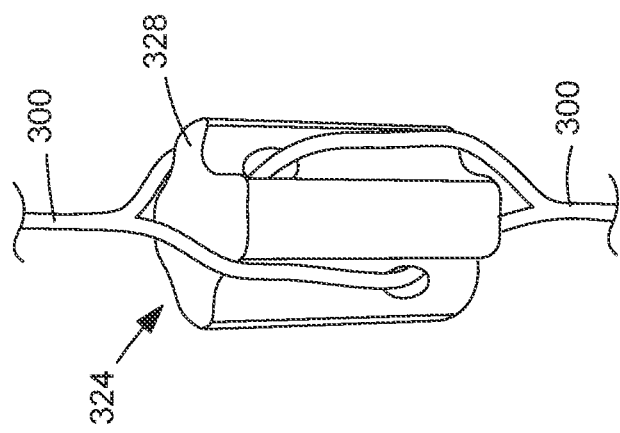
FIG. 11 shows another example of a thermal isolator that can be installed in line with the support wire.
Figure 10:
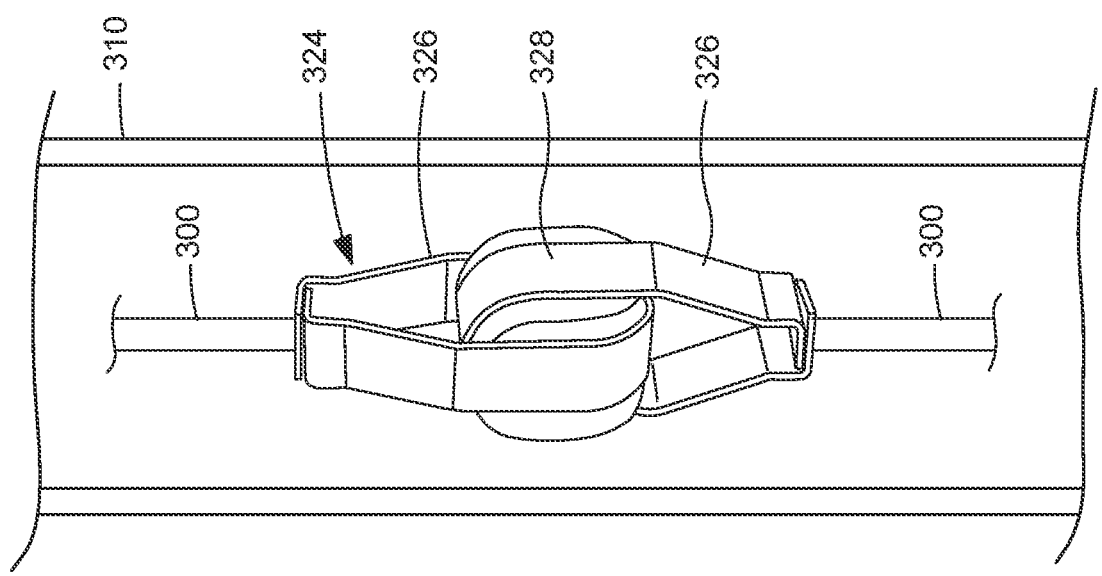
FIG. 10 is a magnified view of the portion of the tank system identified by reference numeral 10 of FIG. 7 and illustrating an example of a thermal isolator installed in-line with the support wire.

FIGS. 10-12 illustrate examples of a thermal isolator 324 that can optionally be installed in-line with the support wire 300 for reducing thermal flow along the support wire 300 from the vacuum tank 220 to the pressure tank 250. In the example of FIG. 10, the thermal isolator 324 has an isolator body 328 and a pair of isolator straps 326. The isolator straps 326 can be formed of a metallic material (e.g., steel) or non-metallic material (graphite-epoxy). The isolator body 328 can be formed of one or more materials having a relatively low thermal conductance, such as ceramic material. The pair of isolator straps 326 are coupled to the isolator body 328 at different clocking orientations in a manner such that the isolator straps 326 are spaced apart in non-contacting relation to each other. In addition, the pair of isolator straps 326 extend in opposite directions toward the support wire 300.

FIG. 11 shows an example of a thermal isolator 324 in which the isolator straps 326 are omitted. Opposite portions of the support wire 300 extend respectively through a pair of openings in the isolator body 328, allowing each support wire portion to be wrapped around the isolator body 328 to form a loop. FIG. 12 shows yet another example of a thermal isolator 324 that can be installed in-line with the support wire 300, and which includes a single clevis-shaped isolator strap 326 attached to one portion of the support wire 300. An opposite portion of the support wire 300 wraps around an isolator body 328 mounted on the clevis-shaped isolator strap 326. As may be appreciated, the thermal isolator 324 can be provided in any one of a variety of sizes, shapes, and configurations, and is not limited to the examples shown in FIGS. 10-12. The thermal isolator 324 preferably has a relatively narrow profile so that the diameter of the support wire sleeve 310 can be minimized.

Referring to FIGS. 13-15, shown is an example of a tank system 200 having a deflection control system 286 configured similar to the above-described deflection control system 286 of FIG. 4, and further including at least one actuator 340 configured to adjust tension force 400 in the elongate support members 288 by an amount counteracting stretching of the elongate support members 288 due to the load 396. For example, the actuator 340 is configured to increase the tension force 400 the first, second, third, and fourth support wires 301, 302, 303, 304 by an amount that counteracts stretching of the first, second, third, and fourth support wires 301, 302, 303, 304 due to the load 396 on the pressure tank 250. In this regard, the actuator 340 provides a means for actively (e.g., in real time) controlling the size of deflections of the pressure tank 250 relative to the vacuum tank 220 when subjected to a load 396 or when the magnitude of the load 396 changes (e.g., increases), to thereby prevent the pressure tank 250 from contacting the vacuum tank 220.

In FIGS. 13-14, the upper end of each of the first, second, third, and fourth support wires 301, 302, 303, 304 passes vertically through an opening 258 (not shown) in the vacuum tank skin 226. As shown in FIG. 14, the upper end of each support wire sleeve 310 can be butted (e.g., sealed) against the vacuum tank skin 226 in a manner sealing the support wire sleeve 310 from the vacuum pressure in the radial gap 210. As an alternative to sealing each support wire sleeve 310 against the vacuum tank skin 226 and allowing the support wire sleeve 310 to move relative to the sleeve seal 308 in the pressure tank skin 256 (FIGS. 7-8), each support wire sleeve 310 can terminate a short distance from the vacuum tank skin 226, and a wire seal 309 (not shown) can be installed in the upper end of the support wire sleeve 310 in an arrangement similar to that described above in FIGS. 9A-9B. The wire seal 309 can be a flexible non-structural seal for sealing around each of the first, second, third, and fourth support wires 301, 302, 303, 304 where they exit the upper end of the support wire sleeve 310. Each wire seal 309 can accommodate deflection of the first, second, third, and fourth support wires 301, 302, 303, 304 relative to the support wire sleeve 310, as may occur due to stretching of the first, second, third, and fourth support wires 301, 302, 303, 304 and/or due to deflection of the pressure tank 220 relative to the vacuum tank 250.

In FIG. 13, each of the first, second, third, and fourth support wires 301, 302, 303, 304 is routed over a pulley 360 mounted to the vacuum tank 220 near the opening 258 where the first, second, third, and fourth support wires 301, 302, 303, 304 exit the vacuum tank 220. In the example shown, each pulley 360 is mounted on a vacuum tank skin stiffener 234. However, the pulleys 360 can be mounted at any location on the pressure tank 250. Further in this regard, the deflection control system 286 is not limited to pulleys 360 for reorienting the first, second, third, and fourth support wires 301, 302, 303, 304 from vertical to horizontal, and can include any one of a variety of alternative arrangements or devices for routing the first, second, third, and fourth support wires 301, 302, 303, 304 to the actuator 340.

In FIGS. 13-15, each of the first, second, third, and fourth support wires 301, 302, 303, 304 is connected to a common actuator 340. However, in other examples not shown, each support wire 300 can be connected to a dedicated actuator as an alternative to connecting all of the support wires 300 to a common actuator 340. In still other examples not shown, a deflection control system 286 can be configured such that fewer than all of the support wires 300 are routed to the actuator 340, and the remaining support wires 300 can be fixedly coupled to the vacuum tank 220 similar to the above-described arrangement shown in FIG. 4. For example, the support wires 301, 304 can be fixedly coupled to the vacuum tank first side 236, and the support wires 302, 303 can be routed to the actuator 340.

FIG. 15 shows the actuator 340 as a linear actuator 342 having a housing 348 containing a piston 346 that is slidable within a cylinder 344. The linear actuator 342 can be powered by any suitable means including electromechanical, pneumatic, hydraulic, or other means. As an alternative to a linear actuator 342, a rotary actuator (not shown) can be implemented for adjusting the first, second, third, and fourth tension forces 401, 402, 403, 404 in the first, second, third, and fourth support wires 301, 302, 303, 304. Regardless of type, the actuator 340 can be mounted to the vacuum tank 220 or the actuator 340 can be mounted to an external structure 350 as shown in FIGS. 13 and 15. The external structure 350 can be any non-movable structure located adjacent to the tank system 200. For example, the external structure 350 can be a structural member (not shown) of the fuselage barrel section 104 (e.g., FIG. 1) into which the tank system 200 is integrated.

In FIGS. 13 and 15, the linear actuator 342 has an actuator arm 356 that is pivotably attached at one end to the piston 346. The opposite end of the actuator arm 356 is pivotably attached to the external structure 350. The actuator 340 housing 348 is pivotally attached to the external structure 350 to allow pivoting motion of the actuator 340 and the actuator arm 356 as the piston 346 moves within the cylinder 344 to adjust the first, second, third, and fourth tension forces 401, 402, 403, 404 in the first, second, third, and fourth support wires 301, 302, 303, 304. As mentioned above, the actuator 340 of the deflection control system 286 is configured to adjust the tension forces 400 in the support wires 300 by an amount counteracting stretching of the support wires 300 due to a load 396 on the pressure tank 250.

In some examples, the deflection control system 286 can include one or more load measuring devices 398 (FIG. 13) configured to measure the magnitude of the loads 396 on the tank system 200. The load measuring devices 398 can be provided as accelerometers (not shown) mounted on the tank system 200, such as on the vacuum tank skin 226 and/or on the pressure tank skin 256. In the example of an aircraft 100 (FIG. 1), the load measuring devices 398 can include accelerometers mounted on the fuselage barrel section 104 containing the tank system 200, or at other locations on the aircraft 100. The load measuring devices 398 (e.g., accelerometers) can measure the magnitude of loads 396 on the tank system 200 during operation of the aircraft 100, including when filling the pressure tank 250 with cryogenic fluid (e.g., for static load measurements), and during various phases of a flight including during taxiing, take-off, cruise flight, and landing (e.g., for inertial load measurements). Measurements from the load measuring devices 398 can be periodically or continuously transmitted to the actuator 340, which adjusts (e.g., increase) the tension forces 400 in the first, second, third, and fourth support wires 301, 302, 303, 304 in proportion to the magnitude of the loads 396 measured by the load measuring devices 398, in a manner counteracting the stretching of the first, second, third, and fourth support wires 301, 302, 303, 304 and maintaining a desired radial gap 210 between the pressure tank 250 and the vacuum tank 220.

In the example of FIGS. 4-5 and 13, the deflection control system 286 includes elongate support members 288 that are oriented vertically and configured for counteracting a load 396 directed vertically downwardly on the pressure tank 250. However, the deflection control system 286 can include elongate support members 288 arranged in any one of a variety of orientations. For example, FIG. 16 shows an example of a tank system 200 in which the elongate support members 288 are oriented vertically and are configured for counteracting a load 396 directed vertically upwardly. Alternatively or additionally, the deflection control system 286 can include at least one or more elongate support members 288 oriented horizontally and configured for counteracting a horizontal load 396 (e.g., a side load). For example, FIG. 17 shows an example of a tank system 200 in which the elongate support members 288 are oriented horizontally and are configured for counteracting a load 396 directed horizontally toward the right. FIG. 18 shows an example of a tank system 200 in which the elongate support members 288 are oriented horizontally and are configured for counteracting a load 396 directed horizontally toward the left. As may be appreciated, the deflection control system 286 can include multiple elongate support members 288 at any one or more locations along a lengthwise direction of the tank system 200, and which can be arranged in any one or more of a variety of orientations, including the orientations shown in FIGS. 5 and 16, 17, and/or 18 and/or in other orientations, for reducing deflections of the pressure tank 250 in response to loads 396 in any direction including, but not limited to, the load directions shown in FIGS. 5 and 16-18.

FIG. 19 shows an exploded view of an example of a tank system 200 similar to the above-described system of FIG. 3, except that the pressure tank 250 and the vacuum tank 220 in FIG. 19 each have a tapered cylindrical shape 382. In addition, the pressure tank skin 256 and the vacuum tank skin 226 each have a straight cross section in the longitudinal or lengthwise direction. However, in another example (not shown) in which the pressure tank 250 and the vacuum tank 220 each have a tapered cylindrical shape 382, the vacuum tank skin 226 and the pressure tank skin 256 may each be provided with a scalloped cross section 268 in the longitudinal or lengthwise direction, similar to the arrangement shown in FIGS. 20-22 and described below, or a sinusoidal cross section 274 similar to the arrangement shown in FIGS. 23-25 and described below. Other cross sections of various shapes may be used with a tapered cylindrical shape 382.

FIGS. 20-22 show an example of the tank system 200 in which the vacuum tank skin 226 and the pressure tank skin 256 have a scalloped cross section 268 in the longitudinal or lengthwise direction. In the example shown, the scalloped cross section 268 is comprised of alternating peaks 270 (FIG. 22) and valleys 272 (FIG. 22). The peaks 270 of the vacuum tank skin 226 are the locations of the vacuum tank maximum diameter 230, and the valleys 272 of the vacuum tank skin 226 are the locations of the vacuum tank minimum diameter 232. Similarly, the peaks 270 of the pressure tank skin 256 are the locations of the pressure tank maximum diameter 262, and the valleys 272 of the pressure tank skin 256 are the locations of the pressure tank minimum diameter.

FIGS. 23-25 show an example of the tank system 200 in which the vacuum tank skin 226 and the pressure tank skin 256 have a pure sinusoidal cross section 274 comprising alternating peaks 270 (FIG. 25) and valleys 272 (FIG. 25). The peaks 270 of the vacuum tank skin 226 are the locations of the vacuum tank maximum diameter 230, and the valleys 272 of the vacuum tank skin 226 are the locations of the vacuum tank minimum diameter 232. Similarly, the peaks 270 of the pressure tank skin 256 are the locations of the pressure tank maximum diameter 262, and the valleys 272 of the pressure tank skin 256 are the locations of the pressure tank minimum diameter. As an alternative to the pure sinusoidal cross section 274 of FIG. 25, the vacuum tank skin 226 and the pressure tank skin 256 can have a modified sinusoidal cross section (not shown), or any one of a variety of other cross-sectional shapes.

As mentioned above, the cross section of the pressure tank skin 256 is preferably complementary to the cross section of the vacuum tank skin 226. In one example, the shape and size of the pressure tank outer surface 260 of the pressure tank skin 256 is preferably complementary to the shape and size of the vacuum tank inner surface 228 of the vacuum tank skin 226. In the example of FIGS. 22 and 25, the shape of the pressure tank skin 256 matches the shape of the vacuum tank skin 226, allowing the pressure tank skin 256 to nest within the vacuum tank skin 226. The ability to nest the pressure tank skin 256 within the vacuum tank skin 226 allows for a relatively small radial gap 210, which improves the volumetric efficiency of the pressure tank 250 in storing cryogenic fluid.

In the tank systems 200 of FIGS. 20-25, the support wires 300 (not shown) can be coupled to the vacuum tank top side (e.g., the vacuum tank first side 236) at the valleys 272 of the scalloped cross section 268 or sinusoidal cross section 274 of the vacuum tank skin 226. The openings 258 for the support wires 300 in the pressure tank top side (e.g., the pressure tank first side 264) can also be located in the valleys 272 of the pressure tank skin 256. Similarly, the support wires 300 can be coupled to the pressure tank bottom side (e.g., the pressure tank second side 266) at the valleys 272 of the pressure tank skin 256. However, the support wires 300 can be attached to the skins 226, 256 at any location, including support wires 300 attached at or near the peaks 270 of the scalloped cross section 268 or the sinusoidal cross section 274 or at other locations, and the support wires 300 are not limited to attachment at the valleys 272.

Figure 26:
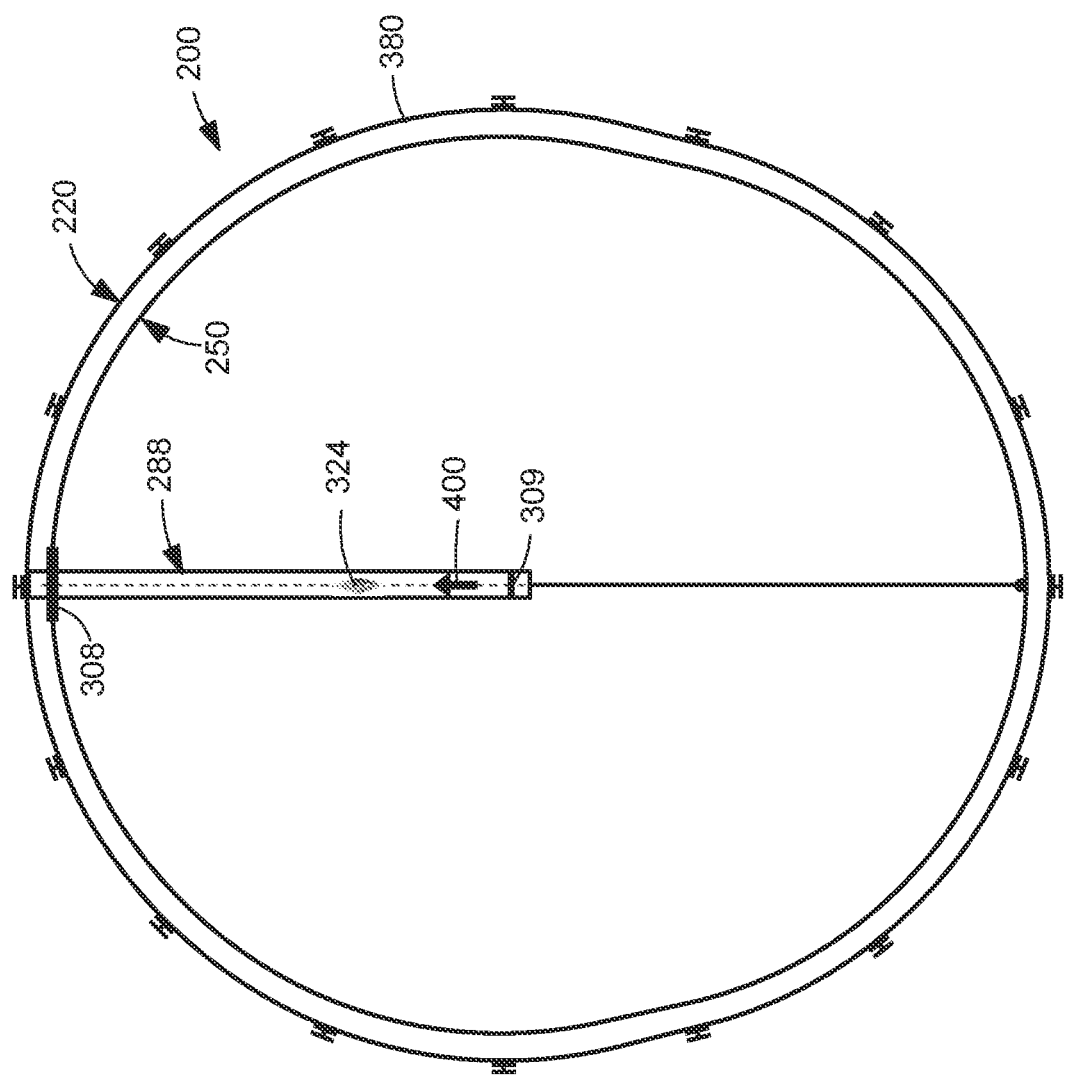
FIG. 26 is an axial sectional view of an example of a tank system having an ovalized cross-sectional shape.

FIG. 26 shows an example of a tank system 200 having an ovalized cross section 386 as an alternative to the circular cross section 384 of FIGS. 2-5. The ovalized cross section 386 of FIG. 26 approximates the cross-sectional shape of a fuselage 102 of a commercial transport aircraft 100 (e.g., FIG. 1). However, as may be appreciated, the pressure tank 250 and the vacuum tank 220 can be provided in any one of a variety of cross-sectional shapes, and are not limited to a circular shape or an ovalized shape.

Figure 27:
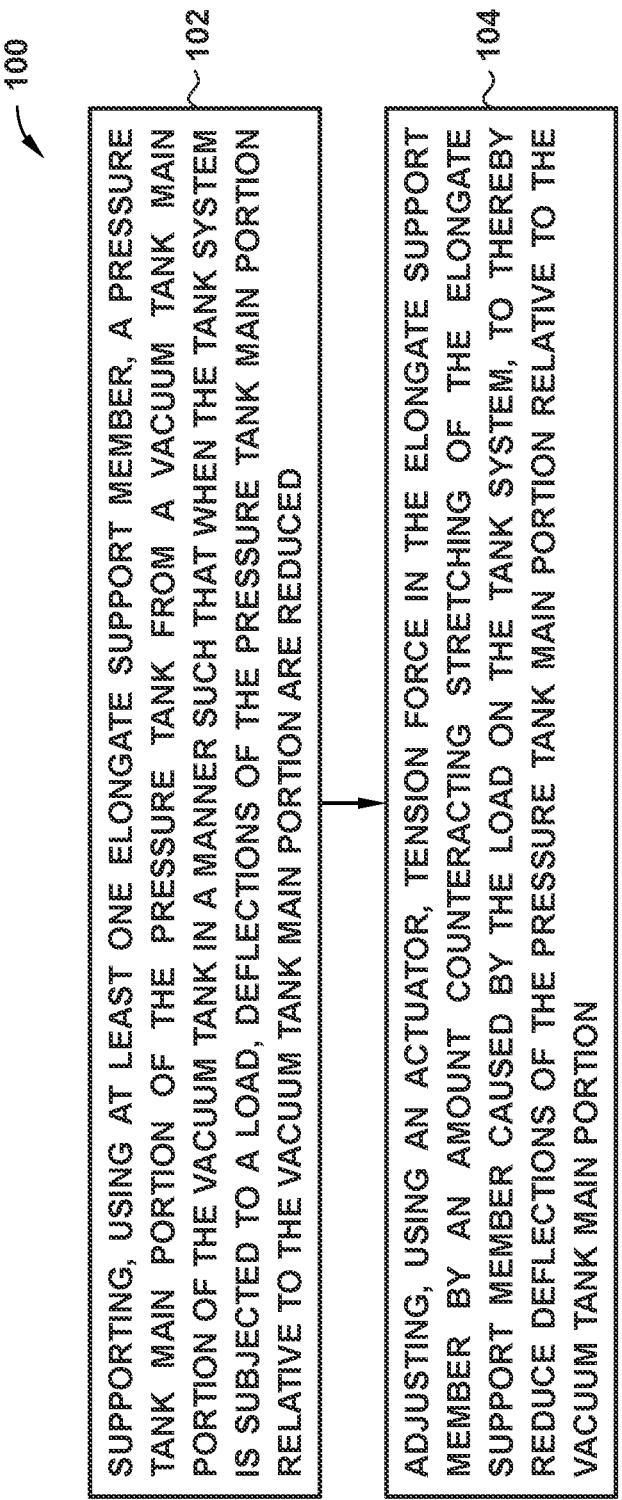
FIG. 27 is a flow diagram of steps included in a method of reducing deflections of a pressure tank mounted within a vacuum tank.

Referring to FIG. 27, shown is a flowchart of a method 500 of controlling the deflections of a pressure tank 250 mounted within a vacuum tank 220. The method 500 is described in the context of a tank system 200 as described above. Any one or more of the components and functionalities of the tank system 200 described above can be implemented in the below-described method 500.

Step 502 of the method comprises supporting, using at least one elongate support member 288 of a deflection control system 286, a pressure tank main portion 252 of the pressure tank 250 from a vacuum tank main portion 222 of the vacuum tank 220 in a manner such that when the tank system 200 is subjected to a load 396, deflections of the pressure tank main portion 252 relative to the vacuum tank main portion 222 are reduced or prevented. As shown in the example of FIGS. 4-5 described above, one or more of the elongate support members 288 extends from the vacuum tank first side 236 of the vacuum tank main portion 222, and through an opening 258 in the pressure tank first side 264 of the pressure tank main portion 252, and are coupled to the pressure tank second side 266 opposite the pressure tank first side 264. By reducing or preventing deflections of the pressure tank 250, the radial gap 210 is maintained between the pressure tank main portion 252 and the vacuum tank main portion 222.

In one example, step 502 of supporting the pressure tank main portion 252 using one or more elongate support members 288 comprises counteracting a vertical load 396 on the tank system 200 using at least one elongate support member 288 oriented vertically, as shown in FIG. 5 (i.e., downward vertical load) or FIG. 16 (i.e., upward vertical load) described above. Alternatively or additionally, step 502 of supporting the pressure tank main portion 252 using one or more elongate support members 288 comprises counteracting a horizontal load 396 on the tank system 200 using at least one elongate support member 288 oriented horizontally, as shown in FIG. 17 (i.e., horizontal load 396 to the right) or FIG. 18 (i.e., horizontal load 396 to the left) described above. In still other examples, step 502 of supporting the pressure tank main portion 252 can comprise using a combination of one or more elongate support members 288 oriented vertically, horizontally, and/or any other direction, to counteract loads 396 in any direction on the tank system 200. In this regard, step 502 is not limited to counteracting either a vertical load 396 or a horizontal load 396.

Step 502 of supporting the pressure tank main portion 252 can be performed for examples in which the pressure tank skin 256 has a scalloped cross section 268, which is complementary to the scalloped cross section 268 of the vacuum tank skin 226, as shown in the example of FIGS. 20-22 and described above. Step 502 can also be performed for examples in which the pressure tank skin 256 has a sinusoidal cross section 274, which is complementary to the sinusoidal cross section 274 of the vacuum tank skin 226, as shown in the example of FIGS. 23-25 and described above. In such an arrangement, the one or more elongate support members 288 can be coupled to the pressure tank skin 256 and the vacuum tank skin 226 at the locations of the valleys 272 of the scalloped cross sections 268 or sinusoidal cross section 274. However, in other examples, the elongate support members 288 can be coupled to the pressure tank skin 256 and the vacuum tank skin 226 at any other lengthwise location.

Step 502 of supporting the pressure tank main portion 252 can be performed using one or more support wires 300. For example, FIGS. 4-5 show a single support wire 300 extending vertically from the vacuum tank top side (i.e., the vacuum tank first side 236) proximate each end of the tank system 200. Each support wires 300 passes through an opening 258 in the pressure tank top side (i.e., the pressure tank first side 264), and terminates at a wire attachment point 312 on the pressure tank bottom side (i.e., the pressure tank second side 266) diametrically opposite the location where the support wire 300 is coupled to the vacuum tank top side. Step 502 of supporting the pressure tank main portion 252 can additionally be performed using one or more support wire assemblies 314, each of which includes a primary support wire 300, a plurality of secondary support wires 320, and a spreader bar 316 as shown in FIG. 4 and described above. Alternatively, step 502 of supporting the pressure tank main portion 252 can be performed using one or more cables, rods, or any one of a variety of other elongate member configurations capable of supporting the pressure tank 250 from the vacuum tank 220 in a manner reducing or preventing deflections of the pressure tank main portion 252 relative to the vacuum tank main portion 222 when the tank system 200 is subjected to a load 396.

The method 500 can additionally include reducing thermal flow into each support wire 300 from cryogenic fluid in the pressure tank 250 by using a support wire sleeve 310 that extends through a sleeve seal 308 in the opening 258 in the pressure tank first side 264. As shown in the above-described FIGS. 7-8, the support wire sleeve 310 surrounds at least a lengthwise section of the support wire 300 in the pressure tank 250. Thermal flow into the support wire 300 can be further reduced if vacuum pressure of the vacuum tank 220 is maintained within the support wire sleeve 310 via a wire seal 309 at the lower end of the support wire sleeve 310 where the support wire 300 exits the support wire sleeve 310, as described above.

The method 500 can include adjusting (e.g., increasing), using an actuator 340, tension force 400 in one or more of the support wires 300 by an amount counteracting stretching (i.e., lengthening) of the one or more support wires 300 caused by the load 396 on the tank system 200, in a manner preventing deflections of the pressure tank 250 relative to the vacuum tank 220. Adjustment of the tension force 400 in the one or more support wires 300 can comprise pivoting an actuator arm 356 of a linear actuator 342 to which the support wires 300 are attached. Pivoting of the actuator arm 356 can be performed by moving a piston 346 relative to a cylinder 344 of a linear actuator 342, as shown in the example of FIG. 15 and described above.

The process of adjusting the tension forces 400 in the support wires 300 comprises measuring, using a load measuring device 398, the magnitude of the load 396 on the tank system 200, and adjusting, using the actuator 340, the tension force 400 in the support wires 300 in proportion to the magnitude of the load 396 in a manner counteracting stretching of the support wires 300, to thereby prevent deflection of the pressure tank main portion 252 relative to the vacuum tank main portion 222. The adjustment of the tension forces 400 can be performed periodically or continuously. In the example of an aircraft 100, the process of adjusting the tension forces 400 can be performed during operation of the aircraft 100, such as during taxiing, take-off, climb out, cruising, descent, and/or landing. The measurement of the load 396 on the tank system 200 can be performed using one or more accelerometers (not shown) included with the deflection control system 286. Alternatively or additionally, the measurement of the load 396 on the tank system 200 can be performed using accelerometers of one or more systems (e.g., autopilot system) of the aircraft 100.

An example of the process of adjusting tension forces 400 in the support wires 300 of a deflection control system 286 is now described with reference to the tank system 200 of FIGS. 13-15. The process initially includes calculating the desired location of the pressure tank skin 256 relative to the vacuum tank skin 226 in one or more locations on the tank system 200. For example, the desired location of the pressure tank skin 256 can be calculated for the lengthwise midpoint (e.g., FIG. 13) of the tank system 200. In another example, the desired location of the pressure tank skin 256 relative to the pressure tank skin 256 can be calculated at each wire attachment point 312 on the pressure tank 250. In the example of FIG. 13, the desired location of the pressure tank skin 256 can be calculated for the wire attachment points 312 respectively of the two support wires 300 respectively located proximate the outboard ends of the pressure tank 250. For the two support wire assemblies 314 (e.g., each comprising a primary support wire 300, three secondary support wires 320, and a spreader bar 316) located inboard of the two outboard support wires 300, the desired location of the pressure tank skin 256 can be calculated at the center wire attachment point 312 of each support wire assembly 314. The desired location of the pressure tank skin 256 and corresponding desired radial gap 210 can depend upon many factors. In the example of an aircraft 100, the desired location of the pressure tank skin 256 can depend upon the deflections of the fuselage structure and the deflections of the pressure tank 250 relative to the vacuum tank 220.

The process of adjusting tension forces 400 in the support wires 300 also includes calculating the current location of the pressure tank skin 256 relative to the vacuum tank skin 226 without support from the first, second, third, and fourth support wires 301, 302, 303, 304. The current location of the pressure tank skin 256 can be expressed in terms of the current size of the radial gap 210 between the pressure tank skin 256 and the vacuum tank skin 226 at the lengthwise midpoint. Calculation of the current location of the pressure tank skin 256 can be performed in real time by a processor (e.g., a flight control computer) using load measurements provided by the one or more load measuring devices 398 of the deflection control system 286.

The process additionally includes calculating the magnitude of first, second, third, and fourth tension forces 401, 402, 403, 404 (FIG. 13) respectively in the first, second, third, and fourth support wires 301, 302, 303, 304 (FIG. 13) required to move the pressure tank 250 from the actual location (e.g., the deflected location) to the desired location. The process also includes calculating the amount that the first, second, third, and fourth support wires 301, 302, 303, 304 will stretch or elongate over their respective lengths during the application of the first, second, third, and fourth tension forces 401, 402, 403, 404. The respective lengths of the first, second, third, and fourth support wires 301, 302, 303, 304 are measured from their respective wire attachment points 312 on the pressure tank skin 256 to their respective arm attachment points 358 (FIG. 13) on the actuator arm 356. Calculation of the stretch of each support wire 300 is based on the magnitude of the tension force in each support wire 300, and the cross-sectional area, length, and modulus of elasticity of the support wire material.

The process includes adjusting the location of the arm attachment point 358 of each support wire 300 on the actuator arm 356 so that when the actuator arm 356 is pivoted (via movement of the piston 346 relative to the cylinder 344) to adjust (e.g., increase) the tension force 400 in the first, second, third, and fourth support wires 301, 302, 303, 304, the movement of the actuator arm 356 will compensate for stretching of the first, second, third, and fourth support wires 301, 302, 303, 304. In the example of FIG. 15, adjustment of the location of the arm attachment points 358 on the actuator arm 356 can be performed by including a lengthwise slot (not shown) in the actuator arm 356. Each wire attachment point 312 can include a bolt (not shown) that is slidable along the slot and to which one of the support wires 301, 302, 303, 304 is attached. Once each bolt is positioned at a location along the slot that will result in the actuator arm 356 compensating for stretching of the support wire 300, the bolt can be locked in position at that location on the slot. When the actuator arm 356 pivots (due to actuation of the piston 346 relative to the cylinder 344) to apply tension forces 400 in the support wires 301, 302, 303, 304 to counteract the load 396 on the tank system 200, the movement of the actuator arm 356 will balance out the stretching of the support wires 301, 302, 303, 304. In this manner, the actuator 340 enables zero relative deflections between the pressure tank 250 and the vacuum tank 220 under load 396.

As an alternative to the arrangement of FIG. 15 in which all of the support wires 300 are connected to a common actuator 340, the deflection control system 286 can include a dedicated actuator 340 for each support wire 301, 302, 303, 304. By connecting each support wire 300 to a dedicated actuator (not shown), the magnitude of the first, second, third, and fourth tension forces 401, 402, 403, 404 respectively applied to the first, second, third, and fourth support wires 301, 302, 303, 304 can be independently controlled.

In some examples, the loading on the tank system 200 will be primarily inertial loads which, in the example of an aircraft 100, can include the above-mentioned maneuvering loads, gust loads, landing loads, and/or other loads which, in some examples, can be characterized as a 2.5 g load condition. Loading of the tank system 200 will result in substantially the same deflection pattern, and the magnitude of the deflections of the pressure tank 250 relative to the vacuum tank 220 can be scaled in proportion to the magnitude of the load (i.e., the acceleration). Using a means (e.g., a finite element model) to calculate the deflected shape of the pressure tank 250 under load, the positions of each cable attachment point 358 can be calculated, and the support wires 301, 302, 303, 304 can be fixedly attached to the actuator arm 356 at those cable attachment points 358. In the above-noted scenario, the magnitude of the first, second, third, and fourth tension forces 401, 402, 403, 404 may not require independent adjustment to accommodate various load conditions during flight.

Referring to FIGS. 28-29, shown in FIG. 28 a is an illustration of a flow diagram of an exemplary aircraft manufacturing and service method 600. FIG. 29 is an illustration of an exemplary block diagram of an aircraft 616. Referring to FIGS. 28 and 29, versions of the disclosure may be described in the context of the aircraft manufacturing and service method 600 as shown in FIG. 28, and the aircraft 616 as shown in FIG. 29.

During pre-production, exemplary aircraft manufacturing and service method 600 may include specification and design 602 of the aircraft and material procurement 604. During manufacturing, component and subassembly manufacturing 606 and system integration 608 of the aircraft 616 takes place. Thereafter, the aircraft 616 may go through certification and delivery 610 in order to be placed in service 612. While in service 612 by a customer, the aircraft 616 may be scheduled for routine maintenance and service 614 (which may also include modification, reconfiguration, refurbishment, and other suitable services).

Each of the processes of the aircraft manufacturing and service method 600 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 29, the aircraft 616 produced by the exemplary aircraft manufacturing and service method 600 may include an airframe 618 with a plurality of systems 620 and an interior 622. Examples of the plurality of systems 620 may include one or more of a propulsion system 624, an electrical system 626, a hydraulic system 628, and an environmental system 630. Any number of other systems 620 may be included. Although an aerospace example is shown, the principles of the disclosure may be applied to other industries, such as the automotive industry, the construction industry, or another suitable industry.

Methods and systems 620 embodied herein may be employed during any one or more of the stages of the aircraft manufacturing and service method 600. For example, components or subassemblies corresponding to component and subassembly manufacturing 606 may be fabricated or manufactured in a manner similar to components or subassemblies produced while the aircraft 616 is in service 612. Also, one or more apparatus embodiments, method embodiments, or a combination thereof, may be utilized during component and subassembly manufacturing 606 and system integration 608, for example, by substantially expediting assembly of or reducing the cost of the aircraft 616. Similarly, one or more of apparatus embodiments, method embodiments, or a combination thereof, may be utilized while the aircraft 616 is in service 612, for example and without limitation, to maintenance and service 614.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A tank system, comprising:
  a vacuum tank having a vacuum tank main portion extending between vacuum tank end portions;
  a pressure tank mounted within the vacuum tank, and having a pressure tank main portion extending between pressure tank end portions;
  a deflection control system for the pressure tank, comprising:
    at least one elongate support member coupled directly to and extending from a vacuum tank wall portion at a vacuum tank first side of the vacuum tank main portion, and passing through an opening in a pressure tank first side of the pressure tank main portion and non-connected to the opening, and coupled to a pressure tank second side opposite the pressure tank first side; and
    the elongate support member configured to support the pressure tank main portion and reduce deflections of the pressure tank main portion relative to the vacuum tank main portion when the tank system is subjected to a load.

2. The tank system of claim 1, wherein:
  the at least one elongate support member comprises a plurality of elongate support members extending from the vacuum tank first side to a respective plurality of wire attachment points along the pressure tank second side.

3. The tank system of claim 1, wherein the at least one elongate support member is oriented according to one of the following:
  the elongate support member is oriented vertically for counteracting a vertical load;
  the elongate support member is oriented horizontally for counteracting a horizontal load.

4. The tank system of claim 1, wherein the at least one elongate support member comprises at least one support wire.

5. The tank system of claim 4, wherein the deflection control system further comprises:
  a sleeve seal mounted in the opening in the pressure tank first side; and
  a support wire sleeve extending through the sleeve seal and surrounding at least a section of the support wire located within the pressure tank and configured to reduce thermal flow into the support wire from cryogenic fluid in the pressure tank.

6. The tank system of claim 1, wherein the deflection control system further comprises:
at least one spreader bar located within the pressure tank;
wherein the at least one elongate support member comprises:
a primary support wire coupled to the vacuum tank first side and extending through the opening in the pressure tank first side, and terminating at a distance from the spreader bar; and
a plurality of secondary support wires, each extending from the primary support wire to spaced locations along the spreader bar, and from the spreader bar to the pressure tank second side.

7. The tank system of claim 1, wherein:
the vacuum tank wall portion comprises a vacuum tank skin having a vacuum tank inner surface;
the pressure tank main portion has a pressure tank skin having a pressure tank outer surface;
the vacuum tank skin and the pressure tank skin each have one of a scalloped cross section or a sinusoidal cross section in a longitudinal direction of the tank system, the scalloped cross section and the sinusoidal cross section each having alternating peaks and valleys; and
the vacuum tank inner surface is complementary to the pressure tank outer surface.

8. An aircraft, comprising:
a fuselage;
a tank system included with the fuselage, and comprising:
a vacuum tank having a vacuum tank main portion extending between vacuum tank end portions;
a pressure tank mounted within the vacuum tank, and having a pressure tank main portion extending between pressure tank end portions, and having a pressure tank skin having a pressure tank outer surface; and
a deflection control system for the pressure tank, comprising:
at least one elongate support member coupled directly to and extending from a vacuum tank wall portion at a vacuum tank first side of the vacuum tank main portion, and passing through an opening in a pressure tank first side of the pressure tank main portion and non-connected to the opening, and coupled to a pressure tank second side diametrically opposite the pressure tank first side; and
the elongate support member configured to support the pressure tank main portion and reduce deflections of the pressure tank main portion relative to the vacuum tank main portion when the tank system is subjected to a load.

9. The aircraft of claim 8, wherein:
the at least one elongate support member comprises a plurality of elongate support members extending from the vacuum tank first side to a respective plurality of wire attachment points along the pressure tank second side.

10. The aircraft of claim 8, wherein the at least one elongate support member is oriented according to one of the following:
the elongate support member is oriented vertically for counteracting a vertical load;
the elongate support member is oriented horizontally for counteracting a horizontal load.

11. The aircraft of claim 8, wherein the at least one elongate support member comprises at least one support wire.

12. The aircraft of claim 11, wherein the deflection control system further comprises:
a sleeve seal mounted in the opening in the pressure tank first side; and
a support wire sleeve extending through the sleeve seal and surrounding at least a section of the support wire located within the pressure tank and configured to reduce thermal flow into the support wire from cryogenic fluid in the pressure tank.

13. The aircraft of claim 8, wherein the deflection control system further comprises:
at least one spreader bar located within the pressure tank;
wherein the at least one elongate support member comprises:
a primary support wire coupled to the vacuum tank first side and extending through the opening in the pressure tank first side, and terminating at a distance from the spreader bar; and
a plurality of secondary support wires, each extending from the primary support wire to spaced locations along the spreader bar, and from the spreader bar to the pressure tank second side.

14. The aircraft of claim 8, wherein:
the vacuum tank wall portion comprises a vacuum tank skin having a vacuum tank inner surface;
the pressure tank main portion has a pressure tank skin having a pressure tank outer surface;
the vacuum tank skin and the pressure tank skin each have one of a scalloped cross section or a sinusoidal cross section in a longitudinal direction of the tank system, the scalloped cross section and the sinusoidal cross section each having alternating peaks and valleys; and
the vacuum tank inner surface is complementary to the pressure tank outer surface.

15. A method of reducing deflections of a pressure tank mounted within a vacuum tank of a tank system, comprising:
supporting, using at least one elongate support member of a deflection control system, a pressure tank main portion extending between pressure tank end portions of the pressure tank, from a vacuum tank main portion extending between vacuum tank end portions of the vacuum tank, in a manner such that when the tank system is subjected to a load, deflections of the pressure tank main portion relative to the vacuum tank main portion are reduced; and
wherein the at least one elongate support member is coupled directly to and extends from a vacuum tank wall portion at a vacuum tank first side of the vacuum tank main portion, and passes through an opening in a pressure tank first side of the pressure tank main portion and is non-connected to the opening, and is coupled to a pressure tank second side opposite the pressure tank first side.

16. The method of claim 15, wherein supporting the pressure tank main portion using the at least one elongate support member comprises one of the following:
counteracting a vertical load on the tank system using at least one elongate support member oriented vertically;
counteracting a horizontal load on the tank system using at least one elongate support member oriented horizontally.

17. The method of claim 15, wherein supporting the pressure tank main portion using the at least one elongate support member comprises:
supporting the pressure tank main portion using at least one support wire.

18. The method of claim 17, supporting the pressure tank main portion using the support wire comprises:

reducing thermal flow into the support wire from cryogenic fluid in the pressure tank using a support wire sleeve extending through a sleeve seal in the opening in the pressure tank first side, the support wire sleeve surrounding at least a section of the support wire located within the pressure tank.

19. The method of claim 15, wherein supporting the pressure tank main portion using the at least one elongate support member comprises:

supporting the pressure tank main portion using a primary support wire and a plurality of secondary support wires;

wherein:

the primary support wire is coupled to the vacuum tank first side, and extends through the opening in the pressure tank first side, and terminates at a distance from a spreader bar; and the secondary support wires each extend from the primary support wire to spaced locations along a spreader bar, and each secondary support wire extends from the spreader bar to the pressure tank second side.

20. The method of claim 15, wherein supporting the pressure tank main portion using the at least one elongate support member comprises:

supporting the pressure tank main portion, of which a pressure tank skin has one of a scalloped cross section or a sinusoidal cross section in a longitudinal direction, and which is complementary respectively to a scalloped cross section or a sinusoidal cross section of a vacuum tank skin.

* * * * *